(12) United States Patent
Shelton et al.

(10) Patent No.: US 7,893,138 B2
(45) Date of Patent: *Feb. 22, 2011

(54) LOW MOLECULAR WEIGHT CARBOXYALKYLCELLULOSE ESTERS AND THEIR USE AS LOW VISCOSITY BINDERS AND MODIFIERS IN COATING COMPOSITIONS

(75) Inventors: Michael Charles Shelton, Kingsport, TN (US); Alan Kent Wilson, Kingsport, TN (US); Jessica Dee Posey-Dowty, Kingsport, TN (US); Gergory Andrew Kramer, Kingsport, TN (US); Luis Guillermo Rios Perdomo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 181 days.

This patent is subject to a terminal disclaimer.

(21) Appl. No.: 10/796,235

(22) Filed: Mar. 9, 2004

(65) Prior Publication Data

US 2004/0180993 A1 Sep. 16, 2004

Related U.S. Application Data

(60) Provisional application No. 60/455,033, filed on Mar. 14, 2003.

(51) Int. Cl.
 *C08L 1/00* (2006.01)
 *C08L 1/14* (2006.01)
 *C08L 1/12* (2006.01)
(52) U.S. Cl. .............. 524/35; 524/38; 524/39
(58) Field of Classification Search ........... 536/66, 536/58; 524/38, 430; 522/88
 See application file for complete search history.

(56) References Cited

U.S. PATENT DOCUMENTS

| | | | |
|---|---|---|---|
| 1,652,573 A | 12/1927 | Mallabar | |
| 1,683,347 A | 9/1928 | Gray et al. | |
| 1,878,954 A | 9/1932 | Malm | |
| 2,129,052 A | 9/1938 | Fordyce | |
| 2,801,239 A | 7/1957 | Hiatt et al. | |
| 3,281,267 A | 10/1966 | Rice | |
| 3,386,932 A | 6/1968 | Steinmann | |
| 3,391,135 A | 7/1968 | Ouno et al. | |
| 3,411,941 A | 11/1968 | Lowe et al. | |
| 3,429,840 A | 2/1969 | Lowe et al. | |
| 3,518,249 A | 6/1970 | Hiatt et al. | |
| 3,850,770 A | 11/1974 | Juna et al. | |
| T941,001 I4 | 12/1975 | Corpening et al. | |
| 3,998,768 A | 12/1976 | Pettit | |
| 4,007,144 A | 2/1977 | Sanders et al. | |
| 4,134,809 A | 1/1979 | Pacifici et al. | |
| 4,170,663 A | 10/1979 | Hahn et al. | |
| 4,389,502 A | 6/1983 | Fry et al. | |
| 4,407,990 A | 10/1983 | Hall et al. | |
| 4,408,028 A | 10/1983 | Nakayama et al. | |
| 4,415,734 A | 11/1983 | Yabune et al. | |
| 4,442,145 A | 4/1984 | Probst et al. | |
| 4,532,177 A | 7/1985 | Mahar | |
| 4,543,409 A | 9/1985 | Diamantoglou et al. | |
| 4,551,491 A | 11/1985 | Panush | |
| 4,551,492 A | 11/1985 | Aerts | |
| 4,565,730 A | 1/1986 | Poth et al. | |
| 4,590,265 A | 5/1986 | Bogan et al. | |
| 4,595,722 A | 6/1986 | Such | |
| 4,598,015 A | 7/1986 | Panush | |
| 4,598,020 A | 7/1986 | Panush | |
| 4,598,111 A | 7/1986 | Wright et al. | |
| 4,603,160 A | 7/1986 | Leonard | |
| 4,605,687 A | 8/1986 | Panush | |
| 4,650,821 A | 3/1987 | Leonard | |
| 4,692,481 A | 9/1987 | Kelly | |
| 4,707,381 A | 11/1987 | Toyama et al. | |
| 4,714,634 A | 12/1987 | Miyazona et al. | |
| 4,725,640 A | 2/1988 | Cowles | |
| 4,732,790 A | 3/1988 | Blackburn et al. | |
| 4,732,791 A | 3/1988 | Blackburn et al. | |
| 4,740,541 A | 4/1988 | Morse | |
| 4,753,829 A | 6/1988 | Panush | |
| 4,755,581 A | 7/1988 | Blackburn et al. | |
| 4,755,582 A | 7/1988 | Blackburn et al. | |
| 4,829,108 A | 5/1989 | Okuda et al. | |

(Continued)

FOREIGN PATENT DOCUMENTS

EP 0 267 409 B1 5/1988

(Continued)

OTHER PUBLICATIONS

U.S. Appl. No. 10/796,176, filed Mar. 9, 2004, Shelton et al.

(Continued)

*Primary Examiner*—James Seidleck
*Assistant Examiner*—Saira Haider
(74) *Attorney, Agent, or Firm*—Polly C. Owen; Bernard J. Graves, Jr.

(57) ABSTRACT

Carboxyalkylcellulose esters are disclosed having relatively low degrees of polymerization. These new carboxyalkylcellulose esters include carboxymethylcellulose acetate, carboxymethylcellulose acetate propionate, and carboxymethylcellulose acetate butyrate. The inventive esters exhibit solubility in a range of organic solvents, and are useful in coatings and ink compositions as binder resins and rheology modifiers.

36 Claims, No Drawings

U.S. PATENT DOCUMENTS

| | | |
|---|---|---|
| 4,855,184 A | 8/1989 | Klun et al. |
| 4,859,758 A | 8/1989 | Shalati et al. |
| 4,888,372 A | 12/1989 | Abrams et al. |
| 4,902,578 A | 2/1990 | Kerr, III |
| 4,970,247 A | 11/1990 | Hoppe et al. |
| 4,975,300 A | 12/1990 | Deviny |
| 4,983,730 A | 1/1991 | Domeshek et al. |
| 5,051,473 A | 9/1991 | Tabuchi et al. |
| 5,086,144 A | 2/1992 | Shalati et al. |
| 5,089,313 A | 2/1992 | Cope |
| 5,091,010 A | 2/1992 | Souma et al. |
| 5,256,453 A | 10/1993 | Heithorn et al. |
| 5,260,358 A | 11/1993 | Shimizu et al. |
| 5,283,126 A | 2/1994 | Rasmussen et al. |
| 5,292,783 A | 3/1994 | Buchanan et al. |
| 5,321,063 A | 6/1994 | Shimada et al. |
| 5,322,560 A | 6/1994 | DePue et al. |
| 5,360,644 A | 11/1994 | Briggs et al. |
| 5,372,638 A | 12/1994 | DePue et al. |
| 5,384,163 A | 1/1995 | Budde et al. |
| 5,389,139 A | 2/1995 | Carpenter et al. |
| 5,418,293 A | 5/1995 | Numa et al. |
| 5,425,969 A | 6/1995 | Wakabayashi et al. |
| 5,449,555 A | 9/1995 | Karstens et al. |
| 5,473,032 A | 12/1995 | Bederke et al. |
| 5,478,386 A | 12/1995 | Itoh et al. |
| 5,480,922 A | 1/1996 | Mülhaupt et al. |
| 5,498,663 A | 3/1996 | Shimada et al. |
| 5,498,781 A | 3/1996 | Hall et al. |
| 5,504,178 A | 4/1996 | Shaffer et al. |
| 5,510,443 A | 4/1996 | Shaffer et al. |
| 5,520,963 A | 5/1996 | Liu |
| 5,527,848 A | 6/1996 | Carpenter et al. |
| 5,545,677 A | 8/1996 | Hall et al. |
| 5,552,458 A | 9/1996 | Hall et al. |
| 5,580,819 A | 12/1996 | Li et al. |
| 5,585,186 A | 12/1996 | Scholz et al. |
| 5,624,757 A | 4/1997 | Smith |
| 5,658,976 A | 8/1997 | Carpenter et al. |
| 5,663,310 A | 9/1997 | Shimoda et al. |
| 5,668,273 A * | 9/1997 | Allen et al. ............. 536/66 |
| 5,670,141 A | 9/1997 | Nebra |
| 5,705,632 A | 1/1998 | Shimoda et al. |
| 5,720,803 A | 2/1998 | Itoh et al. |
| 5,721,015 A | 2/1998 | Iwamura et al. |
| 5,741,880 A | 4/1998 | Valpey et al. |
| 5,744,243 A | 4/1998 | Li et al. |
| 5,753,373 A | 5/1998 | Scholz et al. |
| 5,759,631 A | 6/1998 | Rink et al. |
| 5,821,315 A | 10/1998 | Moriya et al. |
| 5,856,468 A | 1/1999 | Shuto et al. |
| 5,873,931 A | 2/1999 | Scholz et al. |
| 5,914,309 A | 6/1999 | Ulbl et al. |
| 5,914,397 A | 6/1999 | Kiyose et al. |
| 5,919,920 A | 7/1999 | Murakami et al. |
| 5,942,030 A | 8/1999 | Schuhmacher et al. |
| 5,962,677 A | 10/1999 | Murakami et al. |
| 5,990,304 A | 11/1999 | Kiyose et al. |
| 5,993,526 A | 11/1999 | Sommer et al. |
| 5,994,530 A | 11/1999 | Posey-Dowty et al. |
| 5,997,621 A | 12/1999 | Scholz et al. |
| 5,998,035 A | 12/1999 | Iwamura et al. |
| 6,001,484 A | 12/1999 | Horrion et al. |
| 6,001,931 A | 12/1999 | Brahm et al. |
| 6,025,433 A | 2/2000 | Shibatoh et al. |
| 6,040,053 A | 3/2000 | Scholz et al. |
| 6,046,259 A | 4/2000 | Das et al. |
| 6,051,242 A | 4/2000 | Patel et al. |
| 6,099,973 A | 8/2000 | Miyai et al. |
| 6,207,601 B1 | 3/2001 | Maurer et al. |
| 6,218,448 B1 | 4/2001 | Kraaijevanger et al. |
| 6,225,404 B1 | 5/2001 | Sorensen et al. |
| 6,228,433 B1 | 5/2001 | Witt |
| 6,261,642 B1 | 7/2001 | Nagai et al. |
| 6,303,670 B1 | 10/2001 | Fujino et al. |
| 6,313,202 B1 | 11/2001 | Buchanan et al. |
| 6,331,326 B1 | 12/2001 | Tsunoda et al. |
| 6,355,303 B1 | 3/2002 | Vogt-Birnbrich et al. |
| 6,403,152 B1 | 6/2002 | Puligadda et al. |
| 6,407,151 B1 | 6/2002 | Hoppe et al. |
| 6,407,224 B1 | 6/2002 | Mironov et al. |
| 6,509,440 B1 | 1/2003 | Sakane et al. |
| 6,512,044 B1 | 1/2003 | Wilke |
| 6,522,812 B1 | 2/2003 | Nikonov |
| 6,544,593 B1 | 4/2003 | Nagata et al. |
| 6,592,944 B1 | 7/2003 | Uhlianuk et al. |
| 6,596,069 B2 | 7/2003 | Ido et al. |
| 6,607,833 B1 | 8/2003 | Uhlianuk et al. |
| 6,609,677 B2 | 8/2003 | Seybold et al. |
| 6,632,852 B1 | 10/2003 | Chen et al. |
| 6,635,314 B1 | 10/2003 | William et al. |
| 6,653,411 B2 | 11/2003 | Puligadda et al. |
| 6,656,983 B1 | 12/2003 | Mayer et al. |
| 6,689,839 B1 | 2/2004 | Hayakawa et al. |
| 6,696,142 B2 | 2/2004 | Baer et al. |
| 6,758,992 B2 | 7/2004 | Solomon et al. |
| 6,861,495 B2 | 3/2005 | Barsotti et al. |
| 6,870,024 B2 | 3/2005 | Haubennestel et al. |
| 6,903,145 B2 | 6/2005 | Nienhaus et al. |
| 6,913,831 B2 | 7/2005 | Suzuki |
| 6,987,144 B2 | 1/2006 | Anderson et al. |
| 6,997,980 B2 | 2/2006 | Wegner et al. |
| 7,001,948 B2 | 2/2006 | Gupta et al. |
| 7,026,470 B2 | 4/2006 | Obie |
| 7,208,534 B2 | 4/2007 | Van Rooyen |
| 7,585,905 B2 | 9/2009 | Shelton et al. |
| 2002/0197411 A1 | 12/2002 | Colyer et al. |
| 2003/0059547 A1 | 3/2003 | Rihan et al. |
| 2003/0161961 A1 | 8/2003 | Barsotti et al. |
| 2003/0212171 A1 | 11/2003 | Frederick et al. |
| 2004/0058083 A1 | 3/2004 | Lettmann et al. |
| 2004/0101629 A1 | 5/2004 | Baumgart et al. |
| 2004/0110895 A1 | 6/2004 | Anderson et al. |
| 2004/0180993 A1 | 9/2004 | Shelton et al. |
| 2004/0181009 A1 | 9/2004 | Shelton et al. |
| 2004/0185269 A1 | 9/2004 | Loper et al. |
| 2005/0031873 A1 | 2/2005 | Berschel et al. |
| 2005/0100740 A1 | 5/2005 | Lin et al. |
| 2005/0123781 A1 | 6/2005 | Drescher et al. |
| 2005/0132781 A1 | 6/2005 | Seo et al. |
| 2005/0186349 A1 | 8/2005 | Loper et al. |
| 2005/0203278 A1 | 9/2005 | McCreight et al. |
| 2005/0227162 A1 | 10/2005 | Van Rooyen |
| 2006/0052525 A1 | 3/2006 | Staunton et al. |
| 2006/0100353 A1 | 5/2006 | Barsotti et al. |
| 2006/0123890 A1 | 6/2006 | Seo et al. |
| 2007/0028806 A1 | 2/2007 | Piro et al. |
| 2007/0088105 A1 | 4/2007 | Shelton et al. |
| 2007/0282038 A1 | 12/2007 | Bhattacharya et al. |
| 2008/0032067 A1 | 2/2008 | Sakurazawa et al. |
| 2008/0069963 A1 | 3/2008 | Bhattacharya et al. |
| 2008/0085953 A1 | 4/2008 | Bhattacharya et al. |
| 2008/0090960 A1 | 4/2008 | Bhattacharya et al. |

FOREIGN PATENT DOCUMENTS

| | | |
|---|---|---|
| EP | 0 289 997 A2 | 11/1988 |
| EP | 0 515 208 A3 | 11/1992 |
| EP | 0 547 614 A3 | 6/1993 |
| EP | 0 455 211 B2 | 4/1995 |
| EP | 0 803 552 B2 | 5/2000 |
| EP | 1 574 554 A3 | 9/2005 |
| FR | 2 244 572 | 4/1975 |
| GB | 1 122 006 | 7/1968 |

| JP | 51-119088 | 10/1976 |
| JP | 51-119089 | 10/1976 |
| WO | WO 82/02719 | 8/1982 |
| WO | WO 91/16356 | 10/1991 |
| WO | WO 96/20961 | 7/1996 |
| WO | WO 99/59753 | 11/1999 |
| WO | WO 01/35719 | 5/2001 |
| WO | WO 03/070843 A1 | 8/2003 |
| WO | WO 2004/083253 | 9/2004 |
| WO | WO 2004/094515 A1 | 11/2004 |
| WO | WO 2006/116367 A1 | 11/2006 |
| WO | WO 2007/005808 A2 | 1/2007 |
| WO | WO 2007/145929 A2 | 12/2007 |
| WO | 2008036274 A2 | 3/2008 |

OTHER PUBLICATIONS

Kirk-Othmer, Encyclopedia of Chemical Technology, Fourth Ed., vol. 5, pp. 496-529, 509 (1993), John Wiley & Sons, New York, New York.

Nishimura, T.; Nakatsubo, F. "Chemical Synthesis of Cellulose Derivatives by a Convergent Synthetic Method and Several of Their Properites," Cellulose, 1997, 4, 109.

Kawada, T.; Nakatsubo, F.; Murakami, K.; Sakuno, T. "Synthetic Studies of Cellulose IX: Reactivity and Cleavage of Three Kinds of Protective Groups of Synthesized Celloologosaccharide Derivatives," *Mokuzai Gakkaishi*, 1991, 37 (10), 930.

Kawada, T.; Nakatsubo, F.; Umezawa, T.; Murakami, K.; Sakuno, T. "Synthetic Studies of Cellulose XII: First Chemical Synthesis of Cellooctaose Acetate," *Mokuzai Gakkaishi*, 1994, 40 (7), 738.

"Characterization of Cellulose Esters by Solution-State and Solid-State Nuclear Magnetic Resonance Spectroscopy," Editors: T. J. Heinze and W. G. Glasser, Chapter 10 in the ACS Symposium Series 688 :Cellulose Derivatives—Modification, Characterization, and Nanostructures, Douglas W. Lowman, 131-162 (1998).

Miyamoto, T.; Sato, Y.; Shibata, T.; Inagaki, H.; Tanahashi, M; *J. Polym. Sci., Polym. Chem. Ed.*, 1984, 22, 2363.

Buchanan, C. M.; Hyatt, J. A.; Kelley, S. S.; Little, J. L.; *Macromolecules*, 1990, 23, 3747.

Dickey, E. E.; Wolfrom, J. L., A Polymer-Homologous Series of Sugar Acetates from the Acetolysis of Cellulose,: *J. Am. Chem. Soc.*, 1949, 825.

Wolfrom, M. L.; Dacons, J. C., "The Polymer-Homologous Series of Oligosaccharides from Cellulose," *J. Am. Chem. Soc.*, 1952, 5331.

Research Disclosure, Sep. 1978, 17304, p. 19.

U.S. Appl. No. 60/810,923, filed Jun. 5, 2006, Bhattacharya et al.
U.S. Appl. No. 60/810,924, filed Jun. 5, 2006, Bhattacharya et al.
U.S. Appl. No. 60/845,288, filed Sep. 18, 2006, Bhattacharya et al.
U.S. Appl. No. 60/845,374, filed Sep. 18, 2006, Bhattacharya et al.

Malm, Carl J.; Fordyce, Charles R.; Tanner, Howard A. "Properties of Cellulose Esters of Acetic, Propionic, and Butyric Acids," *Ind. Eng. Chem.*, 1942, 34(4), 430.

Abatzoglou, N.; Chornet, E. "Acid Hydrolysis of Hemicelluloses and Cellulose: Theory and Applications," in *Polysaccharides: Structural Diversity and Functional Versatility*, ed. S. Dumitriu, Marcel Dekker, Inc., New York, 1998.

International Search Report and Written Opinion of the International Searching Authority for PCT Application PCT/US2006/015573.

Office Action dated May 16, 2007 from United States Patent and Trademark Office for co-pending U.S. Appl. No. 10/796,176.

PCT International Search Report and Written Opinion with Date of Mailing Jul. 28, 2008 for Related PCT/US2007/020224 Application.

PCT International Search Report and Written Opinion with Date of Mailing Jan. 7, 2008 for Related PCT/US2007/013253 Application.

PCT International Search Report and Written Opinion with Date of Mailing Feb. 6, 2008 for Related PCT/US2007/013212 Application.

PCT International Search Report and Written Opinion with Date of Mailing Mar. 3, 2008 for Related PCT/US2007/020219 Application.

Office Action dated Jan. 25, 2008 from United States Patent and Trademark Office for co-pending U.S. Appl. No. 10/796,176.

Office Action dated Mar. 28, 2008 from United States Patent and Trademark Office for co-pending U.S. Appl. No. 11/801,011.

Office Action dated Apr. 9, 2008 from United States Patent and Trademark Office for co-pending U.S. Appl. No. 11/810,065.

Copending U.S. Appl. No. 11/810,011, filed Jun. 4, 2007, Deepanjan Bhattachary et al.

Copending U.S. Appl. No. 11/856,176, filed Sep. 17, 2007, Deepanjan Bhattacharya et al.

Copending U.S. Appl. No. 11/845,179, filed Sep. 17, 2007, Deepanjan Bhattacharya et al.

PCT International Search Report and Written Opinion with Date of Mailing Jan. 8, 2010 for related PCT/US2009/005144 application.

USPTO Office Action dated Apr. 2, 2009 for copending U.S. Appl. No. 11/394,008.

USPTO Notice of Allowance dated Jun. 1, 2009 for copending U.S. Appl. No. 10/796,176.

USPTO Office Action dated Jan. 22, 2010 for copending U.S. Appl. No. 11/394,008.

Copending U.S. Appl. No. 12/510,324, filed Jul. 28, 2009, Michael Charles Shelton et al.

Copending U.S. Appl. No. 12/559,744, filed Sep. 15, 2009, Deepanjan Bhattachary et al.

Copending U.S. Appl. No. 12/728,427, filed Mar. 22, 2010, Michael Charles Shelton et al.

PCT International Search Report and Written Opinion with Date of Mailing Jun. 22, 2010 for realated PCT/US2010/000839 application.

* cited by examiner

LOW MOLECULAR WEIGHT CARBOXYALKYLCELLULOSE ESTERS AND THEIR USE AS LOW VISCOSITY BINDERS AND MODIFIERS IN COATING COMPOSITIONS

RELATED APPLICATIONS

This application claims priority from U.S. Provisional Pat. Appln. No. 60/455,033, filed Mar. 14, 2003, the disclosure of which is incorporated herein by reference in its entirety.

FIELD OF THE INVENTION

This invention belongs to the field of cellulose chemistry, and more particularly, to low molecular weight carboxyalkylcellulose esters useful in coating and ink compositions as low viscosity binder resins and rheology modifiers.

BACKGROUND OF THE INVENTION

Cellulose esters are valuable polymers that are useful in many plastic, film, coating, and fiber applications. Cellulose esters (CEs) are typically synthesized by the reaction of cellulose with an anhydride or anhydrides corresponding to the desired ester group or groups, using the corresponding carboxylic acid as diluent and product solvent. Some of these ester groups can afterward be hydrolyzed to obtain a partially-esterified product. These partially substituted cellulose esters have great commercial value as opposed to their fully esterified counterparts, and find use in coatings, where their solubility and compatibility with co-resins and available hydroxyl group functionality, which facilitates crosslinking, are prized.

An important aspect in obtaining suitable cellulose esters has traditionally been maintaining molecular weight during the esterification process. A loss in molecular weight is associated with poor plastic properties and brittle films, a flexible film being the desired goal. Thus, it has long been recognized that in order to obtain a suitable chloroform-soluble (triacetate) cellulose ester, the acetylation process must not result in significant degradation, or lowering of the molecular weight, of the cellulose. See, for example, U.S. Pat. No. 1,683,347.

When it was discovered that these early triacetate esters could be modified, via partial hydrolysis of the acetate groups, to obtain acetone-soluble cellulose acetate, maintaining a suitable molecular weight during hydrolysis remained critical. See, for example, U.S. Pat. No. 1,652,573. It was recognized as early as the 1930's that the amount of hydrochloric acid present in the reaction mixture during partial ester hydrolysis must be carefully controlled to avoid hydrolysis or breakdown of the cellulose acetate. See, for example, U.S. Pat. No.1,878,954.

Likewise, U.S. Pat. No. 2,129,052 advised that hydrolysis under severe conditions such as high temperature or high concentration of catalyst caused degradation of the cellulose, the resulting products being unsuitable for commercial use because of their low strength. U.S. Pat. No. 2,801,239, relating to the use of zinc chloride as an esterification catalyst, cited as an advantage that the process minimized the rate of breakdown of the cellulose. U.S. Pat. No. 3,518,249 acknowledged that little interest had been shown in cellulose esters of an extremely low degree of polymerization. More recently it was confirmed that the rate of hydrolysis in cellulose esters is controlled by temperature, catalyst concentration, and, to a lesser extent, by the amount of water, and that higher water content slightly increases the rate of hydrolysis and "helps minimize degradation." Kirk-Othmer, Encyclopedia of Chemical Technology, Fourth Ed., vol. 5, pp. 496-529, 509 (1993), John Wiley & Sons, New York, N.Y.

When used in coating compositions, conventional cellulose esters provide many benefits, including improved hardness, improved aluminum flake orientation, high clarity, high gloss, decreased dry-to-touch time, improved flow and leveling, improved redissolve resistance, reduced cratering, and reduced blocking. However, the performance properties of conventional cellulose esters are accompanied by an increase in viscosity, which must be offset by increasing the level of solvents used. With recent concerns of VOC levels in coating compositions, there remains a need for a cellulose ester product that provides the benefits of conventional cellulose esters, while providing only a moderate increase in viscosity without the addition of organic solvents. It would clearly be an advance in the art to provide cellulose esters that provide the performance properties of conventional cellulose esters, without an undue increase in viscosity when incorporated into coating compositions.

Although maintaining the molecular weight of cellulose esters during esterification and partial hydrolysis has long been deemed important in obtaining a suitable product, there has nonetheless been occasional mention in the literature of lower molecular weight cellulose esters.

For example, U.S. Pat. No. 3,386,932 discloses a method for reducing the molecular weight of cellulose triacetate with a catalyst such as boron trifluoride, the resulting bifunctional, low molecular weight cellulose triacetate then being used to produce linear block copolymers. This disclosure emphasizes the importance of maintaining the ester substitution at the 2-, 3-, and 6-positions of the triacetate, that is, wherein substantially all of the hydroxyl groups of the cellulose have been esterified, so that the hydroxyl functionality necessary for formation of the linear block copolymers preferentially appears only on the ends of the polymer chains.

U.S. Pat. No. 3,391,135 discloses a process in which hydrogen halides are used to reduce the molecular weight of cellulose derivatives. The examples describe methylcellulose powder and methyl-hydroxypropyl cellulose reacted with hydrogen chloride to reduce the molecular weight, as evidenced by a reduction in viscosity.

U.S. Pat. No. 3,518,249 describes oligosaccharide tripropionates, having an average degree of polymerization of from about 4 to about 20 and low levels of hydroxyl, that are useful as plasticizers and as control agents for the manufacture of foamed plastics. The oligosaccharide tripropionates are prepared by degrading a cellulose propionate in the presence of an acid catalyst. The patentees acknowledge that it has been an object in the art to provide methods of preventing the degradation of cellulose esters into low-viscosity oligosaccharide esters.

U.S. Pat. No. 4,532,177 describes base coat compositions that include a film-forming resin component, selected from alkyd, polyester, acrylic and polyurethane resins, from 1.0 to 15.0% by weight pigment, and from 2.0% to 50.0% by weight of a cellulose ester material. The '177 patent suggests a solution viscosity for the cellulose ester material from 0.05-0.005 seconds, an acetyl content from 10.0-15.0% by weight, a propionyl content from 0.1-0.8% by weight, a butyryl content from 36.0-40.0% by weight, and a free-hydroxyl content of from 1.0-2.0% by weight. However, the examples of the patent use a cellulose ester having a solution viscosity of 0.01, which is approximately equivalent to an inherent viscosity (IV) for such an ester of from about 0.25 to about 0.30 dL/g, as measured in a 60/40 (wt./wt.) solution of phenol/tetrachloroethane (PM95) at 25° C.

WO 91/16356 describes a process for the preparation of low molecular weight, high-hydroxyl cellulose esters by treating a cellulose polymer with trifluoroacetic acid, a mineral acid, and an acyl or aryl anhydride in an appropriate carboxylic solvent, followed by optional in situ hydrolysis. The cellulose esters obtained according to the disclosure are said to have a number average molecular weight ($M_n$) ranging from about $0.01 \times 10^5$ (about 1,000) to about $1.0 \times 10^5$ (about. 100,000), and an IV (inherent viscosity) from about 0.2 to about 0.6, as measured at a temperature of. 25° C. for a 0.25 gram sample in 100 ml of a 60/40 by weight solution of phenol/tetrachloroethane.

Japanese Kokai Patent Publication No. 51-119089 describes a process for the preparation of a low molecular weight cellulose mixed organic acid ester that involves heating cellulose acetate with a saturated or unsaturated organic acid of 3 or more carbon atoms (propionyl or higher), in the presence of an acid catalyst, with removal of the resulting acetic acid from the reaction mixture, to obtain a lower molecular weight cellulose mixed organic acid ester. The starting material for this process is cellulose acetate.

Another patent document naming the same inventors, Japanese Kokai Patent Publication No. 51-119088, discloses a method for the manufacture of a low molecular weight cellulose organic acid ester that includes heating cellulose acetate with a saturated or unsaturated organic acid at a temperature above 30° C. in the presence of a cation exchange resin, the resulting ester having a lower molecular weight than the starting material. The starting material for the disclosed process is cellulose acetate.

Both of these references teach low molecular weight mixed cellulose esters. The process uses cellulose acetate as starting material, and performs a transesterification while hydrolyzing the cellulose backbone, the amount of higher mixed ester introduced being relatively low.

U.S. Pat. No. 6,303,670 discloses an ultraviolet-curable cellulosic coating composition comprising a cellulose acetate, a diepoxy compound, and a photo cationic polymerization catalyst. The cellulose acetate useful in these compositions is a low molecular weight cellulose acetate, having a number-average molecular weight of from 1,500 to 5,000, and is prepared from cellulose triacetate by hydrolysis. According to this disclosure, the degree of substitution of hydroxyl groups must be from 1 to 3, since hydroxyl values of less than 1 are said to result in insufficient crosslinking in the final coating composition.

Although efforts have been made to prepare oligosaccharides via stepwise addition of anhydroglucose units, these methods are not believed to result in cellulose derivatives that are suitable for coating applications. Further, the costs of such processes would be significant. See, for example, Nishimura, T.; Nakatsubo, F. "Chemical Synthesis of Cellulose Derivatives by a Convergent Synthetic Method and Several of Their Properties," *Cellulose*, 1997, 4, 109. See also Kawada, T.; Nakatsubo, F.; Umezawa, T.; Murakami, K.; Sakuno, T. "Synthetic Studies of Cellulose XII: First Chemical Synthesis of Cellooctaose Acetate," *Mokuzai Gakkaishi* 1994, 40(7), 738.

Cellulose derivatives other than conventional cellulose esters have also been made and used. Maintaining molecular weight has typically been an important aspect in maintaining the desired performance properties in these esters also.

For example, U.S. Pat. No. 4,520,192 describes a process for preparing carboxyalkyl acetyl celluloses with a carboxyalkyl degree of substitution per anhydroglucose unit (DS) of 0.2-2.5 and an acetyl DS of 0.5-2.8 and the metal salts of these materials. The materials are said to be useful as enteric coating agents, in view of their solubility in organic solvents.

U.S. Pat. No. 3,435,027 describes a base catalyzed (sodium hydroxide), process for partially esterifying carboxymethyl-cellulose (in the sodium salt form) in 70-85% acetone non-solvent media with acetic, propionic, lactic, or stearyl anhydride. The procedure yields a product with a low degree of ester substitution.

USSR Patent 612933 describes a process for preparation of cellulose acetate ethers wherein an alkali activated cellulose (12% sodium hydroxide) is etherified with monochloroacetic acid followed by esterification with acetic anhydride in the presence of sulfuric acid catalyst. The process is limited to a low DS of the carboxymethyl substituent.

U.S. Pat. No. 3,789,117 discloses a process for preparing an enteric medicament coating from an organic solvent-soluble cellulose derivative. The cellulose derivative's substitution has a carboxymethyl DS range of 0.3 to 1.2, in conjunction with at least one of the remaining hydroxyl groups being etherified or esterified. Ester groups include acetyl, propionyl, butyryl, nitric, or higher fatty acids. Higher fatty acid ester derivatives such as carboxymethylcellulose stearic acid ester derivative are said to be preferred.

RO 96929 describes a carboxymethylcellulose (CMC) acetate with a carboxymethyl degree of substitution of 0.5-3.0, acetyl DS of 0.4-2.9, and viscosity 150-1500 cP. This material was taught to be useful as an alkaline suspension stabilizer, solution thickener, and alkaline media binder.

U.S. Pat. No. 5,008,385 reports cellulose derivatives, that can be synthesized by homogeneous reaction in dimethylac-etamide and/or N-methylpyrrolidine containing LiCl, and that have a degree of polymerization of at least 400. Included in their examples was CMC acetate (carboxymethyl DS 0.13-0.23, acetyl DS 2.54-2.15). These materials were tested for use in the production of fibers, filaments, or membranes.

Carbohydrate Research, 13, pp.83-88, (1970) describes the preparation of CMC acetate by sulfuric acid catalyzed acetylation of CMC (carboxymethyl DS of 0.07), hydrolysis (acetylation and hydrolysis procedures taken from Maim, Ind. Eng. Chem., 38 (1946) 77), and evaluation of this material in membranes for reverse osmosis.

Holzforschung, 27(2), pp. 68-70, (1973) describes the rate of carboxymethylation and deacetylation of cellulose acetate in the presence of sodium hydroxide. This work showed that deacetylation and carboxymethylation occur simultaneously with the rate of deacetylation being faster than the rate of carboxymethylation. The highest carboxymethyl DS obtained was less than 0.1.

GB 2,284,421 discloses carboxymethylcellulose alkanoates which are "lightly carboxymethylated", i.e., having a degree of substitution per anhydroglucose unit of less than 0.2. The resulting products are said to be useful as coating agents for paper and papermaking or as bonding agents for non-woven fabric, or can be extruded to form filaments or film, or can be used to produce shaped articles or a sponge. The products can be dissolved in aqueous sodium hydroxide solutions, but the patentees caution that higher concentrations of sodium hydroxide may tend to degrade the cellulose, leading to a reduction in the desired mechanical properties.

U.S. Pat. Nos. 5,668,273 and 5,792,856 disclose carboxymethylcellulose esters of higher acids, having inherent viscosities from 0.20 to 0.70 dL/g, preferably from 0.35 to 0.60 dL/g, as measured in a 60/40 (wt./wt.) solution of phenol/tetrachloroethane at 25° C., that are useful in coating compositions as binder resins and rheology modifiers.

U.S. Pat. No. 5,994,530 discloses carboxymethylcellulose esters of higher acids, having inherent viscosities from 0.20 to 1.7 dL/g, as measured in a 60/40 (wt./wt.) solution of phenol/tetrachloroethane at 25° C, that are useful in aqueous pigment dispersions.

WO 02/036637 discloses the use of carboxymethylcellulose acetate butyrate for improving holdout on a coated, cellulosic fiberboard substrate.

WO 01/035719 discloses the use of carboxymethylcellulose acetate butyrate in a wood stain formulation to provide good adhesion under an overcoat.

There remains a need in the art for cellulose esters that provide suitable properties for coating compositions, and the like, which do not unduly increase the viscosity of the compositions, and which are furthermore dispersible in water.

SUMMARY OF THE INVENTION

The carboxyalkylcellulose esters according to the present invention are low in molecular weight, have a high maximum degree of substitution (are highly substitutable), and provide high solids, low viscosity coating compositions, with none of the drawbacks typically associated with low molecular weight cellulose esters, such as formation of brittle films. When used as coating additives in combination with one or more resins, the inventive esters do not themselves unduly increase the viscosity of the compositions, providing the advantages of conventional cellulose esters without the drawbacks typically associated with their use such as an undesirable increase in organic solvent levels to maintain the desired viscosity. The carboxyalkylcellulose esters according to the invention are dispersible in water, allowing wide latitude to the coatings formulator in solvent selection.

These new carboxyalkylcellulose esters have a high maximum degree of substitution (DS) per anhydroglucose unit on the cellulose backbone in the fully esterified or partially hydrolyzed form, and generally have a DS for hydroxyl groups no greater than about 1.0 (<1.0 DS hydroxyl). The maximum degree of substitution per anhydroglucose unit for the carboxyalkylcellulose esters of this invention is from about 3.08 to about 3.50. These new esters are soluble in a wide range of organic solvents, allowing coatings formulators a wide latitude of solvent choice. They have a minimal impact on both the solution and spray viscosities of high solids coatings. These materials exhibit superior compatibility when blended with other coating resins, thereby yielding clear films with a wider range of coatings resins than do conventional cellulose esters.

DETAILED DESCRIPTION OF THE INVENTION

The applicants have unexpectedly discovered that relatively low molecular weight carboxyalkylcellulose esters, which would be expected to lack the properties necessary to provide the performance characteristics of conventional molecular weight carboxyalkylcellulose esters, can be incorporated into coating compositions, without an undue increase in viscosity, and without the high levels of solvent often necessary in the preparation of waterborne coatings compositions containing conventional CMCAB. Also surprisingly, the properties of the resulting coatings, when the coating compositions are applied and cured, are comparable in many respects to those made using conventional molecular weight carboxyalkylcellulose esters.

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from "about" one particular value, and/or to "about" another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application, in order to more fully describe the state of the art to which the invention pertains.

As used throughout the disclosure, CMCAB means a carboxymethylcellulose acetate butyrate; CMCAP means a carboxymethylcellulose acetate propionate; CMCA means a carboxymethylcellulose acetate; HS-CMCAB means an inventive high solids carboxymethylcellulose acetate butyrate according to the invention, having a high maximum degree of substitution, a low degree of polymerization, a low intrinsic viscosity (IV), and a low molecular weight; CAB means a cellulose acetate butyrate; and CAP means a cellulose acetate propionate.

In one aspect, the invention relates to carboxy($C_1$-$C_3$)alkylcellulose esters having a maximum degree of substitution per anhydroglucose unit of from about 3.08 to about 3.50, and having the following substitutions: a degree of substitution per anhydroglucose unit of carboxy($C_1$-$C_3$)alkyl of from about 0.20 to about 1.2, a degree of substitution per anhydroglucose unit of hydroxyl of from 0 to about 1.0, a degree of substitution per anhydroglucose unit of $C_3$-$C_4$ esters of from about 0 to about 3.30, and a degree of substitution per anhydroglucose unit of acetyl of from 0 to about 3.30; and exhibiting an inherent viscosity of from about 0.05 to about 0.18 dL/g, or from about 0.05 to about 0.15 dL/g, as measured in a 60/40 (wt./wt.) solution of phenol/tetrachloroethane at 25° C.; a number average molecular weight ($M_n$) of from about 1,000 to about 7,000; a weight average molecular weight of from about 1,500 to about 23,000; and a polydispersity of from about 1.20 to about 7.0.

Similar cellulose esters lacking carboxyalkyl functionality are being separately pursued in a copending application filed herewith.

In various embodiments according to the invention, the carboxy($C_1$-$C_3$)alkylcellulose ester may be a carboxymethylcellulose acetate butyrate, and may comprise butyryl ester substitutions at a degree of substitution of from about 0 to about 0.69, or from about 0.66 to about 1.20, or from about 1.15 to about 1.76, or from about 1.68 to about 2.38, or from about 2.27 to about 2.52, or from about 2.52 to about 3.20.

Similarly, in various embodiments, the carboxy($C_1$-$C_3$)alkylcellulose ester may be a carboxymethylcellulose acetate propionate having a propionyl ester substitution at a degree of substitution of from about 0 to about 0.69, or from about 0.66 to about 1.20, or from about 1.15 to about 1.76, or from about 1.68 to about 2.38, or from about 2.27 to about 2.52, or from about 2.52 to about 3.20.

The carboxy($C_1$-$C_3$)alkylcellulose ester may likewise be a carboxymethylcellulose acetate, having a degree of substitution per anhydroglucose unit of acetyl from about 0 to about 0.69, or from about 0.66 to about 1.20, or from about 1.15 to about 1.76, or from about 1.68 to about 2.38, or from about 2.27 to about 2.52, or from about 2.52 to about 3.20.

The carboxyalkyl functionality of the inventive esters may provide the inventive esters with an acid number of from about 40 to about 200 mg KOH/g sample, or of various ranges between these two values, such as from about 40 to about 75 mg KOH/g sample, or from about 75 to about 105 mg KOH/g sample, or from about 105 to about 135 mg KOH/g sample, or from about 135 to about 200 mg KOH/g sample.

In a preferred embodiment, the carboxy($C_1$-$C_3$)alkylcellulose ester is a carboxymethylcellulose ester.

In one aspect, the ester is a carboxymethylcellulose ester having a degree of substitution per anhydroglucose unit of hydroxyl of from 0.10 to 0.90, a degree of substitution of butyryl of from 1.10 to 2.55, and a degree of substitution of acetyl of from about 0.10 to 0.90.

In some embodiments, the ester is a carboxymethylcellulose ester having a degree of substitution per anhydroglucose unit of hydroxyl of from 0.00 to 0.90, or from 0.10 to 0.80, or from 0.10 to 0.70.

In some embodiments, the inherent viscosity of the inventive esters is from 0.07 to 0.13 dL/g. In some embodiments, the number average molecular weight ($M_n$) of the esters is from 1,500 to 5,000.

In certain embodiments, the degree of substitution per anhydroglucose unit of hydroxyl is from 0.10 to 0.80, the degree of substitution of butyryl is from 1.10 to 2.55, and the degree of substitution of acetyl is from 0.10 to about 0.90. In other embodiments, the carboxy($C_1$-$C_3$)alkylcellulose ester is a carboxymethylcellulose acetate propionate having a degree of substitution per anhydroglucose unit of propionyl of from about 0.05 to about 3.30, a degree of substitution per anhydroglucose unit of acetyl of from 0 to about 2.00, and a degree of substitution per anhydroglucose unit of butyryl of from 0 to about 1.00.

The invention also relates to coating compositions, such as those that include: a) from about 0.1 to about 50 weight percent carboxy($C_1$-$C_3$)alkylcellulose ester according to claim 1; b) from about 50 to about 99.9 weight percent, based on the total weight of (a) and (b) in the composition, of at least one resin selected from the group consisting of a polyester, a polyester-amide, a cellulose ester, an alkyd, a polyurethane, an epoxy resin, a polyamide, an acrylic, a vinyl polymer, a polyisocyanate, and a melamine; and c) at least one solvent; wherein the total weight of (a) and (b) is from about 5 to about 85 weight percent of the total weight of (a), (b), and (c). These coating compositions may further include from about 0.1 to about 15 weight percent, based on the total weight of the composition, of one or more coatings additives selected from the group consisting of leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents. The invention relates also to shaped or formed articles coated with such coating compositions, and to coating compositions that are radiation-curable.

The invention further relates to pigment dispersions that include the inventive carboxy($C_1$-$C_3$)alkylcellulose esters and one or more pigments such as alumina or mica. The invention relates also to powder coating compositions that contain the inventive carboxy($C_1$-$C_3$)alkylcellulose esters. The esters also find use in ink compositions, and in waterborne coating compositions generally, as further defined herein.

Unless indicated otherwise: HS-CMCAB-64 refers to an inventive high solids carboxymethylcellulose acetate butyrate with a high maximum degree of substitution, a low degree of polymerization, a low IV, a low molecular weight, and a medium butyryl content (mid-butyryl, of from about 35 to about 45 wt. %), and an acid number of from about 40 to about 75. HS-CMCAB-94 refers to an inventive high solids carboxymethylcellulose acetate butyrate with a high maximum degree of substitution, a low degree of polymerization, a low IV, a low molecular weight, and a medium butyryl content (mid-butyryl, of from about 35 to about 45 wt. %), and an acid number of from about 75 to about 105. HS-CMCAB-124 refers to an inventive high solids carboxymethylcellulose acetate butyrate with a high maximum degree of substitution, a low degree of polymerization, a low IV, a low molecular weight, and a medium butyryl content (mid-butyryl, of from about 35 to about 45 wt. %), and an acid number of from about 105 to about 135. HS-CMCAB-184 refers to an inventive high solids carboxymethylcellulose acetate butyrate with a high maximum degree of substitution, a low degree of polymerization, a low IV, a low molecular weight, and a medium butyryl content (mid-butyryl, of from about 35 to about 45 wt. %), and an acid number of from about 135 to about 200.

Unless indicated otherwise: HS-CMCAB-62 refers to an inventive high solids carboxymethylcellulose acetate butyrate with a high maximum degree of substitution, a low degree of polymerization, a low IV, a low molecular weight, and a low butyryl content (low-butyryl, of from about 15 to about 25 wt. %), and an acid number of from about 40 to about 75.

HS-CMCAB-92 refers to an inventive high solids carboxymethylcellulose acetate butyrate with a high maximum degree of substitution, a low degree of polymerization, a low IV, a low molecular weight, and a low butyryl content (low-butyryl, of from about 15 to about 25 wt. %), and an acid number of-from about 75 to about 105. HS-CMCAB-122 refers to an inventive high solids carboxymethylcellulose acetate butyrate with a high maximum degree of substitution, a low degree of polymerization, a low IV, a low molecular weight, and a low butyryl content (low-butyryl, of from about 15 to about 25 wt. %), and an acid number of from about 105 to about 135. HS-CMCAB-182 refers to an inventive high solids carboxymethylcellulose acetate butyrate with a high maximum degree of substitution, a low degree of polymerization, a low IV:, a low molecular weight, and a low butyryl content (low-butyryl, of from about 15 to about 25 wt. %), and an acid number of from about 135 to about 200.

Similarly, unless indicated otherwise: HS-CMCAB-63 refers to an inventive high solids carboxymethylcellulose acetate butyrate with a high maximum degree of substitution, a low degree of polymerization, a low IV, a low molecular weight, and a low -mid butyryl content (low-mid butyryl, of from about 25 to about 35 wt. %), and an acid number of from about 40 to about 75. HS-CMCAB-93 refers to an inventive high solids carboxymethylcellulose acetate butyrate with a high maximum degree of substitution, a low degree of polymerization, a low IV, a low molecular weight, and low -mid butyryl content (low-mid butyryl, of from about 25 to about 35 wt. %), and an acid number of from about 75 to about 105. HS-CMCAB-123 refers to an inventive high solids carboxymethylcellulose acetate butyrate with a high maximum degree of substitution, a low degree of polymerization, a low IV, a low molecular weight, and low -mid butyryl content (low-mid butyryl, of from about 25 to about 35 wt. %), and an acid number of from about 105 to about 135. HS-CMCAB-183 refers to an inventive high solids carboxymethylcellulose acetate butyrate with a high maximum degree of substitution, a low degree of polymerization, a low IV, a low molecular weight, and low -mid butyryl content (low-mid butyryl, of from about 25 to about 35 wt. %), and an acid number of from about 135 to about 200.

Further, unless indicated otherwise: HS-CMCAB-65 refers to an inventive high solids carboxymethylcellulose acetate butyrate with a high maximum degree of substitution, a low degree of polymerization, a low IV, a low molecular weight, and a high butyryl content (high butyryl, of from about 45 to about 55 wt. %), and an acid number of from about 40 to about 75. HS-CMCAB-95 refers to an inventive high solids carboxymethylcellulose acetate butyrate with a high maximum degree of substitution, a low degree of polymerization, a low IV, a low molecular weight, and high butyryl content (high butyryl, of from about 45 to about 55 wt. %), and an acid number of from about 75 to about 105. HS-CMCAB-125 refers to an inventive high solids carboxymethylcellulose acetate butyrate with a high maximum degree of substitution, a low degree of polymerization, a low IV, a low molecular weight, and high butyryl content (high butyryl, of from about 45 to about 55 wt. %), and an acid number of from about 105 to about 135. HS-CMCAB-185 refers to an inventive high solids carboxymethylcellulose acetate butyrate with a high maximum degree of substitution, a low degree of polymerization, a low IV, a low molecular weight, and high butyryl content (high butyryl, of from about 45 to about 55 wt. %), and an acid number of from about 135 to about 200.

Still further, unless indicated otherwise: HS-CMCAB-61 refers to an inventive high solids carboxymethylcellulose acetate butyrate with a high maximum degree of substitution, a low degree of polymerization, a low IV, a low molecular weight, and a low butyryl content (low butyryl, of from about 0.1% to about 15 wt. %), and an acid number of from about 40 to about 75. HS-CMCAB-91 refers to an inventive high solids carboxymethylcellulose acetate butyrate with a high maximum degree of substitution, a low degree of polymerization, a low IV, a low molecular weight, and low butyryl content (low butyryl, of from about 45 to about 55 wt. %), and an acid number of from about 75 to about 105. HS-CMCAB-121 refers to an inventive high solids carboxymethylcellulose acetate butyrate with a high maximum degree of substitution, a low degree of polymerization, a low IV, a low molecular weight, and low butyryl content (low butyryl, of from about 45 to about 55 wt. %), and an acid number of from about 105 to about 135. HS-CMCAB-181 refers to an inventive high solids carboxymethylcellulose acetate butyrate with a high maximum degree of substitution, a low degree of polymerization, a low IV, a low molecular weight, and low butyryl content (low butyryl, of from about 45 to about 55 wt. %), and an acid number of from about 135 to about 200.

Thus in one embodiment, there is provided a carboxy($C_1$-$C_3$)alkylcellulose acetate butyrate, preferably a carboxymethylcellulose acetate butyrate, having a maximum degree of substitution of from about 3.08 to about 3.50, and a degree of substitution per anhydroglucose unit of carboxy($C_1$-$C_3$)alkyl, preferably carboxymethyl, from 0.20 to 1.20, and a degree of substitution per anhydroglucose unit of hydroxyl from about 0 to 1.0, and a degree of substitution per anhydroglucose unit of butyryl of about 0 to 3.30 and a degree of substitution per anhydroglucose unit of acetyl of 0.00 to 3.30, and having an inherent viscosity of 0.05 to 0.18 dL/g, or 0.05 to 0.15 dL/g, as measured in a 60/40 (wt./wt.) solution of phenol/tetrachloroethane at 25° C. The inherent viscosity may also be from 0.07 to 0.13 dL/g. The degree of substitution per anhydroglucose unit of carboxymethyl may be from 0.20 to 0.75, the degree of substitution per anhydroglucose unit of hydroxyl from 0.10 to 0.90, the degree of substitution per anhydroglucose unit of butyryl from 1.10 to 3.25, and the degree of substitution per anhydroglucose unit of acetyl from 0.10 to 0.90.

As a further embodiment, there is provided a carboxy($C_1$-$C_3$)alkylcellulose acetate propionate, preferably a carboxymethylcellulose acetate propionate, having a maximum degree of substitution of from about 3.08 to about 3.50, and a degree of substitution per anhydroglucose unit of carboxymethyl from about 0.20 to about 1.20, and a degree of substitution per anhydroglucose unit of hydroxyl from about 0.00 to 1.0, and a degree of substitution per anhydroglucose unit of propionyl of about 0.80 to 3.30 and a degree of substitution per anhydroglucose unit of acetyl of 0.00 to 2.00, and having an inherent viscosity of 0.05 to 0.18 dL/g, as measured in a 60/40 (wt.lwt.), solution of phenol/tetrachloroethane at 25° C. The inherent viscosity alternatively may be from 0.07 to 0.13 dL/g. The degree of substitution per anhydroglucose unit of carboxymethyl may be from 0.20 to 0.50, for hydroxyl from 0.10 to 0.90, for propionyl from 1.10 to 3.25, and for acetyl from 0.10 to 0.90.

As a further embodiment, there is provided a carboxy($C_1$-$C_3$)alkylcellulose acetate, preferably a carboxymethylcellulose acetate, having a maximum degree of substitution of from about 3.08 to about 3.50, and a degree of substitution per anhydroglucose unit of carboxymethyl from about 0.20 to about 1.20, and a degree of substitution per anhydroglucose unit of hydroxyl from about 0.00 to 1.0, and a degree of substitution per anhydroglucose unit of acetyl of about 0.80 to 3.30, and having an inherent viscosity of 0.05 to 0.18 dL/g, as measured in a 60/40 (wt./wt.) solution of phenol/tetrachloroethane at 25° C. Alternatively, the inherent viscosity may likewise be from 0.07 to 0.13 dL/g. The degree of substitution per anhydroglucose unit of carboxymethyl from 0.20 to 0.50, for hydroxyl from 0.10 to 0.90, and for acetyl from 2.62 to 3.12.

Different grades and sources of carboxyalkylcellulose are available and are useful according to the invention, and can be selected from cotton linters, softwood pulp, hardwood pulp, corn fiber and other agricultural sources, and bacterial cellulose, among others. The source of carboxyalkylcellulose used to prepare the cellulose esters of the invention is important in providing a product having suitable properties. It is generally preferred that a dissolving-grade carboxyalkylcellulose be used as starting material for preparing the carboxyalkylcellulose esters of this invention. It is more preferred that the dissolving-grade carboxyalkylcellulose have an α-cellulose content of greater than 94%. Those skilled in the art will also recognize that the use of carboxyalkylcellulose from different sources may require modifications to the reaction conditions (e.g. temperature, catalyst loading, time) in order to account for any differences in the reactivity of the cellulose.

The carboxyalkylcellulose esters of the invention, that may be carboxy($C_1$-$C_3$)alkylcellulose esters, preferably carboxymethylcellulose esters, may be prepared by a multi-step process. In this process, carboxymethylcellulose is converted to the protonated form with aqueous sulfuric acid, and then washed with water to remove the sulfuric acid. This is followed by water displacement via solvent exchange with an alkanoic acid such as acetic acid followed by treatment with a higher alkanoic acid (propionic acid or butyric acid), to give an activated carboxymethylcellulose wet with the appropriate alkanoic acid. It should be noted that different grades and sources of dissolving grade carboxymethylcellulose are available and can be selected from cotton linters, softwood pulp, and hardwood pulp.

Next, the activated carboxymethylcellulose is treated with the desired anhydride in the presence of a strong acid catalyst such as sulfuric acid, to give a fully substituted carboxymethylcellulose ester with a lower molecular weight. A final solution (consisting of water and an alkanoic acid) is added slowly to the anhydrous "dope" solution so as to allow removal of combined sulfur from the carboxymethylcellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the carboxymethylcellulose backbone. This product is then hydrolyzed using sulfuric acid to provide a partially substituted carboxymethylcellulose ester. Hydrolysis is important to provide gel-free solutions in organic solvents, and to provide better compatibility with other resins in coatings applications. The hydroxyl groups exposed during hydrolysis are also important crosslinking sites in many coatings applications.

Next, the sulfuric acid is neutralized, after the esterification or hydrolysis reactions are complete, by addition of a stoichiometric amount of an alkali or alkaline earth metal alkanoate, for example magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of the carboxymethylcellulose ester are isolated by diluting the final neutralized "dope" with an equal volume of acetic acid followed by precipitation of the diluted "dope" into a volume of water about 20 to 30 times its weight to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

The key descriptors of the inventive carboxyalkylcellulose esters are thus the level of carboxyalkyl functionality (and thus the acid number), the level of substitution of the various ester groups (i.e. degree of substitution or wt. % are commonly used and are discussed in detail in other parts of this application), the level of hydroxyl groups, and the size of the polymer backbone, which can be inferred from IV, viscosity, and GPC data. The key factors that influence the resulting composition of the inventive cellulose mixed esters thus produced are: the carboxyalkyl level of the starting material, acetic anhydride level, acetic acid level, butyric (or propionic). anhydride level, butyric (or propionic) acid level, water level, cellulose level, catalyst type, catalyst level, time, and temperature. One skilled in the art will appreciate that higher catalyst loadings, higher temperatures, and/or longer reaction times during esterification are used to produce the inventive cellulose esters, having lower molecular weights than conventional esters.

The carboxyalkylcellulose esters according to the invention may have a weight average molecular weight, $M_w$, as measured by GPC, of from about 1,500 to about 23,000; preferably from about 2,000 to about 8,500; a number average molecular weight, $M_n$, as measured by GPC, of from about 1,000 to about 7,000; and a polydispersity, defined as $M_w/M_n$, of from about 1.2 to about 7, preferably from about 1.2 to about 4.5, more preferably from about 1.2 to about 3.

Traditionally, cellulose esters, including carboxyalkylcellulose esters, are considered to have a maximum degree of substitution of 3.0. A DS of 3.0 indicates that there are 3.0 reactive hydroxyl groups in cellulose that can be derivatized. Native cellulose is a large polysaccharide with a degree of polymerization from 700-2,000, and thus the assumption that the maximum DS is 3.0 is approximately correct. However, as the degree of polymerization is lowered, the end groups of the polysaccharide backbone become relatively more important. In the carboxyalkylcellulose esters according to the invention, this change in maximum DS influences the performance of the esters, by changing the solubility in various solvents and the compatibility with various coatings resins.

Table 1 gives the $DS_{Max}$ at various degrees of polymerization. Mathematically, a degree of polymerization of 401 is required in order to have a maximum DS of 3.00. As the table indicates, the increase in $DS_{Max}$ that occurs with a decrease in DP is slow, and for the most part, assuming a maximum DS of 3.00 is acceptable. However, once the DP is low enough, for example a DP of 21, then it becomes appropriate to use a different maximum DS for all calculations.

TABLE 1

| DP | $DS_{Max}$ |
|---|---|
| 1 | 5.00 |
| 2 | 4.00 |
| 3 | 3.67 |
| 4 | 3.50 |
| 5 | 3.40 |
| 6 | 3.33 |
| 7 | 3.29 |
| 8 | 3.25 |
| 9 | 3.22 |
| 10 | 3.20 |
| 11 | 3.18 |
| 12 | 3.17 |
| 13 | 3.15 |
| 14 | 3.14 |
| 15 | 3.13 |
| 16 | 3.13 |
| 17 | 3.12 |
| 18 | 3.11 |
| 19 | 3.11 |
| 20 | 3.10 |
| 21 | 3.10 |
| 22 | 3.09 |
| 23 | 3.09 |
| 24 | 3.08 |
| 25 | 3.08 |
| 50 | 3.04 |
| 75 | 3.03 |
| 100 | 3.02 |
| 134 | 3.01 |
| 401 | 3.00 |

The present invention thus provides a carboxyalkylcellulose ester with a high maximum degree of substitution and a low degree of polymerization.

Without being bound by any theory, we believe that the carboxyalkylcellulose esters of to the invention exhibit a fairly random substitution pattern of hydroxyl groups. We believe that this random substitution pattern of hydroxyl groups results from performing the molecular weight reduction step prior to hydrolysis of the ester groups. The low molecular weight cellulose ester products of the prior art processes are believed to exhibit a non-random substitution pattern, particularly at C-4 of the non-reducing terminus and at C-1 (RT1) of the reducing terminus. The products of the prior art generally have a hydroxyl group at C-4 and either a hydroxyl or ester at C-1 (RT-1) depending on whether the process is a hydrolysis or an acetolysis reaction.

Without being bound by any theory, the widely accepted mechanism presented in Scheme 1 may help the reader to visualize the statement above. The proposed mechanism presented in Scheme 1 depicts the reaction of a polysaccharide with a high degree of polymerization, the nature of the groups at C4 and RT1 being influenced by the amount of cleavage that occurs. The substitution at the two carbons of interest, C4 and RT1, increases to large levels as more and more glycosidic bonds are cleaved. Scheme 1 shows only a single glythe desired degree of polymerization while the reaction mixture is still anhydrous (i.e. before hydrolysis). As a result, the hydrolysis of esters during the preparation of the products of this invention is believed to produce essentially a random distribution of hydroxyl groups throughout the entire cellulosic backbone. This belief is based, in part, on the unique solubility profiles exhibited by the esters according to the invention. Those skilled in the art will recognize that under kinetically controlled conditions, hydrolysis will occur preferentially at certain sites (e.g. C6>>C2>C3). The hydrolysis process practiced in this invention is performed under thermodynamic control (i.e. under equilibrium conditions), which is believed to result in a more random distribution of hydroxyl functionality throughout the cellulosic backbone.

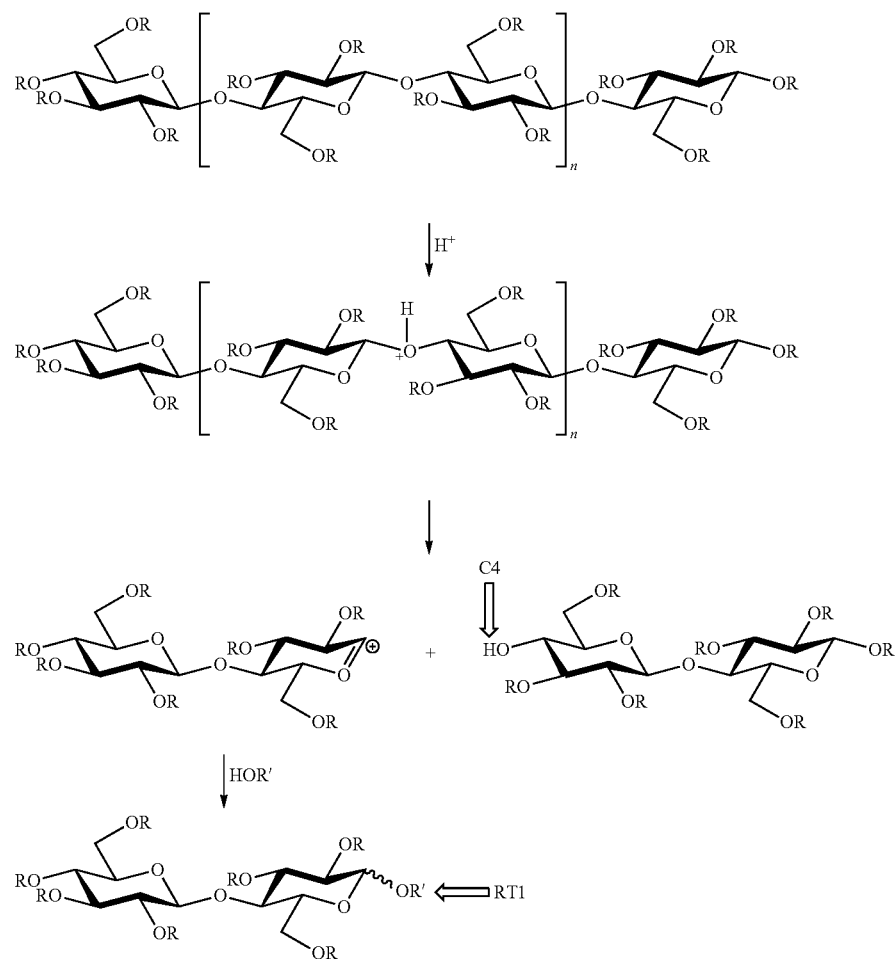

Scheme 1.
Proposed mechanism for the hydrolysis and acetolysis of glycosidic bonds.

cosidic bond being cleaved and thus only one C4 and one RT1 site have the substitution pattern displayed by products generated by the prior art. As more and more sites are cleaved, the effect of the substitution pattern at C4 and RT1 becomes relatively more important.

The process used to prepare the products of the present invention results in a fully-esterified ester (excluding the locations that are carboxyalkylated) having approximately Carboxyalkylcellulose esters of the invention have utility in pigment dispersions by blending the cellulose ester and a pigment with shear to disperse the pigment. In this manner, pigments can be easily dispersed in coating formulations, thereby providing high coloring power and good transparency while using a minimal amount of pigment. Such pigment dispersions can be improved by the use of the cellulose esters of the present invention in place of conventional carboxyalkylcellulose esters.

The carboxyalkylcellulose esters of the present invention also impart markedly improved wetting properties to the pigment dispersion. Mixtures of $C_2$-$C_4$ esters of carboxyalkylcellulose and pigments at pigment:ester weight ratios of about 20:80 to 50:50 may be prepared. These dispersions can be prepared on a ball mill, a Kady mill, a sand mill, or the like. The high $DS_{Max}$, low DP carboxyalkylcellulose esters of this invention have an advantage over conventional carboxyalkylcellulose esters in that they have less of an impact on the viscosity, and thus allow formulations with a higher binder loading to be used.

Thus, the present invention provides a pigment dispersion comprising about 20 to 77 weight percent of a pigment and correspondingly about 33 to 80 percent by weight of a $C_2$-$C_4$ ester of carboxyalkylcellulose having an inherent viscosity of about 0.05 to 0.15 dL/g, as measured in a 60/40 (wt./wt.) solution of phenol/tetrachloroethane at 25° C., and a degree of substitution per anhydroglucose unit of C2-C4 esters of about 0.8 to about 3.5.

The above polymers are easily formulated into either lacquer or enamel type coatings where they are used as rheology modifiers and/or binder components providing improved aluminum flake orientation and improved hardness. They can provide a water-clear, high gloss, protective coating for a variety of substrates, especially metal and wood.

Carboxyalkylcellulose esters of this invention, especially high $DS_{Max}$, low DP carboxyalkylcellulose acetate butyrate, exhibit essentially equivalent and often improved solubility and compatibility (i.e., film clarity) characteristics, when compared with conventional carboxymethylcellulose acetate butyrate, CMCAB-641-0.5). For example, HS-CMCAB-64 is soluble (soluble means completely dissolved at a 10% solvent loading in a given solvent or solvent blend) in DIBK and CMCAB-641-0.5 is insoluble. Additionally, HS-CMCAB-64 is soluble in Eastman C-11 Ketone (a mixture of saturated and unsaturated, linear and cyclic ketones) while CMCAB-641-0.5 is only partially soluble. Additionally, HS-CMCAB-64 is soluble in toluene/ethyl acetate (70:30), MAK, ethyl acetate, n-butyl propionate, n-butyl acetate, n-propyl propionate, and Eastman PP, whereas CMCAB-641-0.5 produces gels in the previously described solvents and solvent blends.

Examples of typical solvents in which certain of the inventive esters may exhibit solubility include acetone, methyl ethyl ketone, methyl isobutyl ketone, methyl amyl ketone, methyl propyl ketone, 2-propoxyethanol, 2-butoxyethanol, ethyl 3-ethoxypropionate, ethanol, methanol, isopropyl alcohol, diacetone alcohol, ethylene glycol monobutyl ether acetate, ethyl acetate, propyl acetate, isopropyl acetate, butyl acetate, isobutyl acetate, diethylene glycol ethyl ether, Eastman PM acetate (propylene glycol methyl acetate), Eastman EB acetate (ethylene glycol butyl acetate), Eastman PM Solvent (propylene glycol monomethyl ether), Eastman DM Solvent (diethylene glycol methyl ether), Eastman PB Solvent (propylene glycol monobutyl ether, Eastman DE Solvent (diethylene glycol ethyl ether), Eastman PP Solvent (propylene glycol monopropyl ether), Eastman EP Solvent (ethylene glycol monopropyl ether), Eastman EB Solvent (ethylene glycol monobutyl ether), Eastman 95% Tecsol C (ethanol with methanol, MIBK and ethyl acetate as denaturants with 5% water), N-methyl pyrrolidone, Eastman EEP Solvent (ethyl 3-ethoxypropionate), and other volatile inert solvents typically used in coating compositions. For example, organic solutions of the esters of this invention can be prepared by adding 1 to 1000 parts of solvent per part of ester; 1.5 to 9 parts of solvent per part of ester is preferred.

One skilled in the art will recognize that the solubility of a carboxyalkylcellulose ester is determined by a number of factors, including carboxyalkyl content, percent of neutralization of carboxylic functionality, degree of substitution of esters, the nature of the esters, degree of substitution of hydroxyl groups, pattern of substitution, and the viscosity. The carboxyalkylcellulose esters of this invention are soluble in a wide range of solvents.

The $C_2$-$C_4$ esters of carboxyalkylcellulose of this invention are useful as rheology modifiers. At low concentrations (<5 weight percent on total formulation), coatings mixtures have shown exponential viscosity changes with changes of as little as 0.5 weight percent concentration of the $C_2$-$C_4$ esters of carboxyalkylcellulose. This rapid viscosity build is especially useful in the reduction of runs and sags in high solids spray applications. This result was unexpected because with the short backbone chain length of these esters, one would not expect enough chain entanglement to provide this effect.

Further, the esters of the present invention are relatively hard polymers, i.e., about 12 Knoop Hardness Units (KHU), and have high glass transition temperatures. They can be added to other resins to improve the coating hardness, and to improve properties such as slip, sag resistance, and mar resistance. To further improve the toughness, crosslinkers such as melamines or isocyanates may be added to react with these esters or with other resins.

The esters of the present invention may possess free hydroxyl groups, and thus may be utilized in conjunction with crosslinking agents such as melamines and isocyanates. Such melamines are preferably compounds having a plurality of —N(CH$_2$OR)$_2$ functional groups, wherein R is $C_1$-$C_4$ alkyl, preferably methyl. In general, the melamine cross-linking agent may be selected from compounds of the following formula, wherein R is independently $C_1$-$C_4$ alkyl:

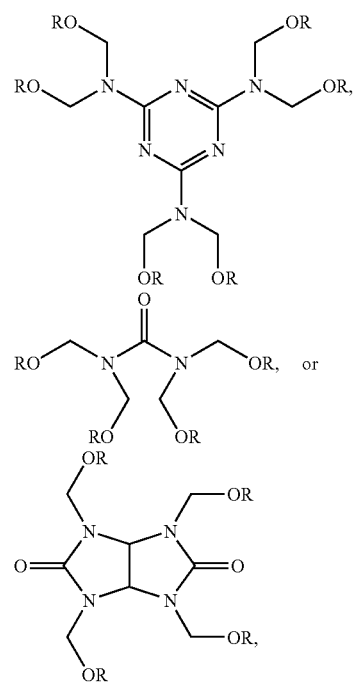

-continued

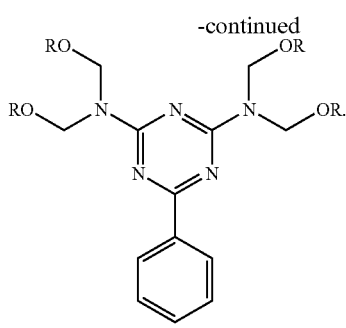

In this regard, preferred cross-linking agents include hexamethoxymethylamine, tetramethoxymethylbenzo-guanamine, tetramethoxymethylurea, mixed butoxy/methoxy substituted melamines, and the like. An especially preferred melamine cross-linking agent is hexamethoxymethylamine.

Typical isocyanate crosslinking agents and resins include hexamethylene diisocyanate (HMDI), isophorone diisocyanate (IPDI), and toluene diisocyanate.

The carboxyalkylcellulose esters of this invention are effective flow additives for high solids coatings formulations. Addition of the carboxyalkylcellulose esters according to the invention to high solids coatings formulations generally results in the elimination of surface defects in the film upon curing/drying (i.e. elimination of pinholing and orange peel). A distinct advantage that high $DS_{Max}$, low DP carboxyalkylcellulose esters have over conventional carboxyalkylcellulose esters is that the new esters have a minimal impact on solution and/or spray viscosity when added to high solids coatings formulations. The percent solids can be increased relative to organic solvent, thus reducing the VOC of the formulation. Conventional carboxyalkylcellulose esters can be used in these same applications as flow additives, in many cases, but a reduction in solids must generally accompany the addition of the conventional carboxyalkylcellulose esters. That is, the solvent level must be increased so as to maintain a desirable viscosity.

Thus the present invention also provides a coating composition comprising (a) about 0.1 to about 50 weight percent, based on the total weight (a) and (b) in said composition, of a $C_2$-$C_4$ ester of carboxy($C_1$-$C_3$)alkylcellulose having an inherent viscosity of about 0.05 to 0.15 dL/g, as measured in a 60/40 (wt./wt.) solution of phenol/tetrachloroethane at 25° C., a degree of substitution per anhydroglucose unit of carboxy($C_1$-$C_3$)alkyl of greater than 0.2 to about 0.75, and a degree of substitution per anhydroglucose unit of C2-C4 esters of about 1.5 to about 3.30;

(b) from about 50 to about 99.9 weight percent, based on the total weight of (a) and (b) in said composition, of a resin selected from the group consisting of polyesters, polyesteramides, cellulose esters, alkyds, polyurethanes, epoxy resins, polyamides, acrylics, vinyl polymers, polyisocyanates, and melamines; and (c) an organic solvent or solvent mixture;

wherein the total weight of (a) and (b) is about 5 to 70 weight percent of the total weight of (a), (b), and (c).

In the compositions of the invention, the total weight of a), b), and c) will of course equal 100%.

The carboxy($C_1$-$C_3$)alkylcellulose esters of the present invention may also be utilized in waterborne coating compositions. For example, these esters may be dissolved in organic solvents, partially neutralized, and dispersed in water. Examples of such solvents include, but are not limited to, 2-butanone, methyl amyl ketone, methanol, ethanol, ethyl 3-ethoxypropionate, ethylene glycol monoethyl ether, ethylene glycol monopropyl ether, and ethylene glycol monobutyl ether, and the like. Dispersion of the modified carboxy($C_1$-$C_3$)alkylcellulose esters of the present invention in water can be obtained by providing about 25 to about 100% neutralization of the pendant carboxylate groups with an amine. Typical amines include, but are not limited to, ammonia, piperidine, 4-ethylmorpholine, diethanolamine, triethanolamine, ethanolamine, tributylamine, dibutylamine, dimethylamino ethanol, and 2-amino-2-methyl-1-propanol.

The amount of suitable aqueous solvent in the dispersed coating composition of such embodiments may be from about 50 to about 90 wt %, or from about 75 to about 90 wt %, of the total coating composition.

Thus, as a further aspect of the present invention, there is provided a waterborne coating composition comprising:

(a) about 0.1 to about 50 weight percent, based on the total weight of (a) and (b), of a $C_2$-$C_4$ ester of carboxy($C_1$-$C_3$)alkylcellulose, exhibiting an inherent viscosity of about 0.05 to 0.15 dL/g, as measured in a 60/40 (wt./wt.) solution of phenol/tetrachloroethane at 25° C., a degree of substitution per anhydroglucose unit of carboxy($C_1$-$C_3$)alkyl of greater than about 0.20 to about 0.75, and a degree of substitution per anhydroglucose unit of $C_2$-$C_4$ esters of about 1.50 to about 3.30; wherein a portion of free carboxyl groups on said $C_2$-$C_4$ ester of carboxy($C_1$-$C_3$)alkylcellulose have been neutralized with ammonia or an amine;

(b) at least 50 weight percent, based on the total weight of (a) and (b), of a compatible water soluble or water dispersible resin selected from the group consisting of polyesters, polyesteramides, cellulose esters, alkyds, polyurethanes, epoxy resins, polyamides, acrylics, vinyl polymers, polyurethanes, and melamines;

(c) water; and (d) an organic solvent;

wherein the total weight of (a) and (b) is between 5 and 50 weight percent of the total composition and the organic solvent comprises less than 20 weight percent of the total weight of the composition.

As a further aspect of the present invention, the above compositions are further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID™; polypropylene, available from Hercules Inc., under the trademark HERCOFLAT™; synthetic silicate, available from J. M Huber Corporation under the trademark ZEOLEX™; and polyethylene.

Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all are available from BYK Chemie U.S.A. under the trademark ANTI TERRA™. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethylcellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the FOAMASTER™ and NOPCO™ trademarks of Henkel Corp./Coating Chemicals, under the DREWPLUS™ trademark of the Drew Industrial Division of Ashland Chemical Company, under the TROYSOL™ and TROYKYD™ trademarks of Troy Chemical Corporation, and under the SAGTM trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxy-methyl-N-methyidithiocarbamate, 2-(thiocyano-methylthio) benzothiazole, potassium dimethyl d ithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trade name Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

To prepare coated articles according to the present invention, a formulated coating composition containing the carboxyalkylcellulose esters of the present invention is applied to a substrate and allowed to dry. The substrate can be, for example, wood; plastic; metal, such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions according to the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: Cl Pigment White 6 (titanium dioxide); Cl Pigment Red 101 (red iron oxide); Cl Pigment Yellow 42, Cl Pigment Blue 15, 15:1, 15:2, 15:3, 15:4 (copper phthalocyanines); Cl Pigment Red 49:1; and Cl Pigment Red 57:1.

Conventional cellulose acetate butyrates described in this disclosure were commercial samples from Eastman Chemical Company, Kingsport, Tennessee, as follows: CAB-171-15, CAB-381-0.1, CAB-381-0.5, CAB-381-20, CAB-551-0.01 and CAB-551-0.2. Commercial CMCAB (carboxymethylcellulose acetate butyrate) samples were from Eastman Chemical Company as follows: CMCAB-641-0.5 and CMCAB-641-0.2. Desmodur HL was obtained from Bayer as a 60% solution in butyl acetate.

According to the present disclosure, CAB means a cellulose acetate butyrate; CAP means a cellulose acetate propionate; CA means a cellulose acetate; CMCAB means a carboxymethylcellulose acetate butyrate; CMCAP means a carboxymethylcellulose acetate propionate; CMCA means a carboxymethylcellulose acetate; HS-CMCAB means an inventive high solids carboxymethylcellulose acetate butyrate according to the invention with a high maximum degree of substitution, a low degree of polymerization, a low IV, and a low molecular weight; HS-CMCAP means an inventive high solids carboxymethylcellulose acetate propionate with a high maximum degree of substitution, a low degree of polymerization, a low IV, and a low molecular weight; HS-CMCA means an inventive high solids carboxymethylcellulose acetate with a high maximum degree of substitution, low degree of polymerization, low IV, and low molecular weight.

In the present disclosure, the following terms have the given meanings:

Strike-in means redissolve of the basecoat caused by the solvents in a clearcoat and typically results in a mottled or muddy appearance of the basecoat pigment/metal flakes.

High Solids Coatings are coatings with a higher % solids in the formulation than traditional coatings, this typically means coatings formulations with a % solids level greater than or equal to 60%.

Medium Solids Coatings are coatings with a higher % solids in the formulation than low solids coatings, this typically means coatings formulations with a % solids level between 40% and 60%.

Low Solids Coatings are coatings with a low % solids in the formulation, this typically means coatings formulations with a.% solids level less than 40%.

Gloss is a subjective term used to describe the relative amount and nature of mirror like reflection.

Orange Peel is a paint surface appearance resembling an orange skin texture.

A Surface Defect is any abnormality on the surface of a coating that adversely affects the appearance of the coating; examples include pinholes, craters, and orange peel.

Pinholes (Pinholing) are film surface defects characterized by small pore-like flaws in a coating, which extend entirely through the coating and have the general appearance of pinpricks.

Craters are small bowl-shaped depressions frequently having drops or bands of material at their centers and raised circular edges in a coating film.

Cratering is the formation in a wet coating film of small bowl-shaped depressions that persist after drying.

Dry-To-Touch Time is the interval between application and tack-free time (i.e. the amount of time required for a coating to feel dry.

Reducing Terminus means the terminal saccharide of a disaccharide, trisaccharide, oligosaccharide or polysaccharide that has no other saccharide attached at C1. The C1 can be functionalized with either a hydroxyl group or an ester group.

Non-reducing Terminus means the terminal saccharide of a disaccharide, trisaccharide, oligosaccharide or polysaccharide that has no other saccharide attached at C4. The C4 can be functionalized with either a. hydroxyl group or an ester group.

Acetolysis means the cleavage of a glycosidic bond in the absence of water and in the presence of a catalyst and a carboxylic acid, including but not limited to acetic acid.

Hydrolysis means the cleavage of a glycosidic bond in the presence of water and a catalyst.

Hydrolysis also means the cleavage of an ester linkage of a cellulose ester in the presence of water and a catalyst to generate a free hydroxyl group on the cellulosic backbone.

Travel means change in color as the angle of viewing a goniochromatic material, such as a metallic paint film, is changed from the perpendicular to near-grazing. Sometimes called flop or flip-flop.

Flop means where two different painted panels appear to be a good match for color when viewed at a given angle, but appear different at all other angles.

Double Rub is the act of rubbing a solvent saturated cloth in one complete forward and backward motion over the coated surface.

Some of the preceding definitions were adapted from Coatings Encyclopedic Dictionary, ed. LeSota, S.; 1995, Federation of Societies for Coatings Technology, Blue Bell, PA, incorporated herein by reference.

Experimental

The $^1$H NMR results are obtained using a JEOL Model GX-400 NMR spectrometer operated at 400 MHz. Sample tube size is 5 mm. The sample temperature is 80° C., the pulse delay 5 sec. and 64 scans are acquired for each experiment. Chemical shifts are reported in ppm from tetramethylsilane, with residual DMSO as an internal reference. The chemical shift of residual DMSO is set to 2.49 ppm.

For the carboxy($C_1$-$C_3$)alkylcellulose esters, a GC method is used to determine acetyl, propionyl, and butyryl, rather than NMR, because the methylene of the carboxyl($C_1$-$C_3$)alkyl group cannot be easily separated from the ring protons of the cellulose backbone, making absolute DS measurements by NMR difficult. The DS values are calculated by converting the acid number to percent carboxymethyl and using this along with the GC weight percents of acetyl, propionyl, and butyryl.

The acetyl, propionyl, and butyryl weight percents are determined by a hydrolysis GC method. In this method, about 1 g of ester is weighed into a weighing bottle and dried in a vacuum oven at 105° C. for at least 30 minutes. Then 0.500±0.001 g of sample is weighed into a 250 mL Erlenmeyer flask. To this flask is added 50 mL of a solution of 9.16 g isovaleric acid, 99%, in 2000 mL pyridine. This mixture is heated to reflux for about 10 minutes, after which 30 mL of isopropanolic potassium hydroxide solution is added. This mixture is heated at reflux for about 10 minutes. The mixture is allowed to cool with stirring for 20 minutes, and then 3 mL of concentrated hydrochloric acid is added. The mixture is stirred for 5 minutes, and then allowed to settle for 5 minutes. About 3 mL of solution is transferred to a centrifuge tube and centrifuged for about 5 minutes. The liquid is analyzed by GC (split injection and flame ionization detector) with a 25M× 0.53 mm fused silica column with 1 μm FFAP phase.

The weight percent acyl is calculated as follows, where:

$C_i$=concentration of I (acyl group)
$F_i$=relative response factor for component I
$F_s$=relative response factor for isovaleric acid
$A_i$=area of component I
$A_s$=area of isovaleric acid
R=(grams of isovaleric acid)/(g sample)
$C_i = ((F_i * A_i)/F_s * A_s)) * R * 100$ This GC method is used, along with NMR, to determine weight % acetyl, propionyl, and butyryl, and the method used is indicated.

The acid number of the carboxy($C_1$-$C_3$)alkylcellulose esters is determined by titration as follows. An accurately weighed aliquot (0.5-1.0g) of the carboxy($C_1$-$C_3$)alkylcellulose ester is mixed with 50 mL of pyridine and stirred. To this mixture is added 40 mL of acetone followed by stirring. Finally, 20 mL of water is added and the mixture stirred again. This mixture is titrated with 0.1 N sodium hydroxide in water using a glass/combination electrode. A blank consisting of 50 mL of pyridine,.40 mL of acetone, and 20 mL of water is also titrated. The acid number is calculated as follows where:

Ep=mL NaOH solution to reach end point of sample
B=mL NaOH solution to reach end point of blank
N=normality of sodium hydroxide solution
Wt.=weight of carboxy (C1-C3) alkylcellulose ester titrated.
Acid Number (mg KOH/g sample)=((Ep−B)*N*56.1)/Wt.

IV Test Method

The inherent viscosity (IV) of the cellulose esters and carboxy($C_1$-$C_3$)alkylcellulose esters described in this invention, except where indicated otherwise, is determined by measuring the flow time of a solution of known polymer concentration and the flow time of a solvent-blank in a capillary viscometer, and then calculating the IV.

IV is defined by the following equation:

$$(n)^{25° C.}_{0.50\%} = \frac{\ln\frac{t_s}{t_o}}{C}$$

where:

(n)=Inherent Viscosity at 25° C. at a polymer concentration of 0.50 g/1 00 mL of solvent.
ln=Natural logarithm
$t_s$=Sample flow time
$t_o$=Solvent-blank flow time
C=Concentration of polymer in grams per 100 mL of solvent=0.50

Samples are prepared to a concentration of 0.50 g per 100 mL of solvent (60% phenol and 40% 1,1,2,2-tetrachloroethane, or "PM95," by weight). The sample (0.25 g) is weighed into a culture tube containing a stir bar. 50.0 mL of 60% phenol and 40% 1,1,2,2-tetrachloroethane by weight (also described in the application as "PM95") is added. The mixture is placed in a heater and heated with stirring (300 rpm) to 125° C. (7 minutes to reach the target temperature and 15 minute hold at 125° C.). The sample is allowed to cool to room temperature (25° C.) and is then filtered and placed in the viscometer (Model AVS 500—Schott America, Glass &

Scientific Products, Inc., Yonkers, N.Y.). IV is calculated according to the equation above.

GPC Method for Molecular Weight Determination

The molecular weight distributions of cellulose ester and carboxy($C_1$-$C_3$)alkylcellulose ester samples are determined by gel permeation chromatography (GPC) using one of two methods listed below.

Method 1, THF: The molecular weight distributions of cellulose ester samples indicated as being tested by GPC with THF as a solvent are determined at ambient temperature in Burdick and Jackson GPC-grade THF stabilized with BHT, at a flow rate of 1 ml/min. All other samples are determined using GPC with NMP as a solvent, as set forth in Method 2 below. Sample solutions are prepared by dissolution of about 50 mg of polymer in 10 ml of THF, to which 10 µl of toluene is added as a flow-rate marker. An autosampler is used to inject 50 µl of each solution onto a Polymer Laboratories PLgel® column set consisting of a 5 µm Guard, a Mixed-C® and an Oligopore® column in series. The eluting polymer is detected by differential refractometry, with the detector cell held at 30° C. The detector signal is recorded by a Polymer Laboratories Caliber® data acquisition system, and the chromatograms are integrated with software developed at Eastman Chemical Company. A calibration curve is determined with a set of eighteen nearly monodisperse polystyrene standards with molecular weight from 266 to 3,200,000 g/mole and 1-phenylhexane at 162 g/mole. The molecular weight distributions and averages are reported either as equivalent polystyrene values, or as true molecular weights calculated by means of a universal calibration procedure with the following parameters:

$K_{PS}$=0.0128 $a_{PS}$=0.712
$K_{CE}$=0.00757 $a_{CE}$=0.842

Method 2, NMP: The molecular weight distributions of all samples not otherwise indicated are determined by GPC with NMP as a solvent, as follows. The molecular weight distributions of cellulose ester samples are determined by gel permeation chromatography at 40° C. in Burdick and Jackson N-Methylpyrrolidone with 1% Baker glacial acetic acid by weight, at a flow rate of 0.8 ml/min. Sample solutions are prepared by dissolution of about 25 mg of polymer in 10 ml of NMP, to which 10 µl of toluene is added as a flow-rate marker. An autosampler is used to inject 20 µl of each solution onto a Polymer Laboratories PLgel® column set consisting of a 10 µm Guard, a Mixed-B® column. The eluting polymer is detected by differential refractometry, with the detector cell held at 40° C. The detector signal is recorded by a Polymer Laboratories Caliber® data acquisition system, and the chromatograms are integrated with software developed at Eastman Chemical Company. A calibration curve is determined with a set of eighteen nearly monodisperse polystyrene standards with molecular weight from 580 to 3,200,000 g/mole. The molecular weight distributions and averages are reported as equivalent polystyrene values.

The invention can be further illustrated by the following examples of preferred embodiments, although it will be understood that these examples are included merely for purposes of illustration and are not intended to limit the scope of the invention unless otherwise specifically indicated.

EXAMPLES

Example 1

Carboxymethylcellulose (Na salt form, 0.31-0.35 DS carboxymethyl), prepared from cotton linters, was converted to the free acid (CMC-H) by adding 100 grams of CMC-Na to 2000 grams of 10% sulfuric acid. After about 10 minutes of agitation, the slurry was filtered free of excess liquids and washed with demineralized water. The water-wet CMC-H was then solvent-exchanged first with acetic acid and then with butyric acid to yield a butyric acid-wet CMC-H.

Then 150 grams of the butyric acid-wet CMC-H (about 40% solids) was placed in a 1 liter reaction kettle and cooled to about 15° C. and a 15° C. solution of 16 grams of acetic anhydride, 210 grams of butyric anhydride, and 3.02 grams of sulfuric acid was added and this mixture held at 25° C. for 1 hour. The temperature of the reaction mixture was then raised to 60° C. and held for 1.67 hours. Then a 60° C. solution of 76 grams of water and 76 grams of acetic acid was added and the reaction temperature was maintained at 60° C. and held at this temperature for 4 hours. Then a solution of 7.3 grams of magnesium acetate tetrahydrate in 20 grams of water and 320 grams of acetic acid was added. This mixture was cooled to 50° C. and filtered. The product was precipitated by pouring the solution into about 20 times its volume of water. The resulting solid was filtered and washed free of organic acids with water and dried at 60° C. The resulting white solid had the following composition: $DS_{Bu}$=2.26 (calculated value based on 43.25 wt % butyryl); $DS_{Ac}$=0.47 (calculated value based on 5.42 wt % acetyl); $DS_{Pr}$=0.01 (calculated value based on 0.19 wt % propionyl); DS carboxymethyl=0.32 (calculated value based on an acid number of 48.60); $M_n$=4,700; $M_w$=22,800; Polydispersity=4.85; IV (PM95)=0.14 dL/g; and an acid number of 48.60 mg KOH/gram of sample.

Example 2

Carboxymethylcellulose (Na salt form, 0.31-0.35 carboxymethyl), prepared from cotton linters, was converted to the free acid (CMC-H) by adding 100 grams of CMC-Na to 2000 grams of 10% sulfuric acid. After about 10 minutes the slurry was filtered free of excess liquids and washed with demineralized water. The water-wet CMC-H was then solvent-exchanged first with acetic acid and then with butyric acid to yield a butyric acid-wet CMC-H.

Then 150 grams of the butyric acid-wet CMC-H (about 40% solids) was placed in a 1 liter reaction kettle and cooled to about 15° C., and a 15° C. solution of 16 grams of acetic anhydride, 210 grams of butyric anhydride, and 3.02 grams of sulfuric acid was added and this mixture held at 25° C. for 1 hour. The temperature of this mixture was then raised to 60° C. and held for 2.5 hours. Then a 60° C. solution of 76 grams of water and 76 grams of acetic acid was added and the reaction temperature was maintained at 60° C. and held at this temperature for 4 hours. Then a solution of 7.3 grams of magnesium acetate tetrahydrate in 20 grams of water and 320 grams of acetic acid was added. This mixture was cooled to 50° C. and filtered. The product was precipitated by pouring the solution into about 20 times its volume of water. The resulting solid was filtered and washed free of organic acids with water and dried at 60° C. The resulting white solid had the following composition: $DS_{Bu}$=2.22 (calculated value based on 42.89 wt % butyryl); $DS_{Ac}$=0.46 (calculated value based on 5.34 wt % acetyl); $DS_{Pr}$=0.02 (calculated value based on 0.30 wt % propionyl), DS carboxymethyl=0.31 (calculated value based on an acid number of 46.82); $M_n$=4,600; $M_w$=13,100; Polydispersity=2.81; IV (PM95)=0.11 dL/g; and an acid number of 46.82 mg KOH/gram of sample.

Example 3

Carboxymethylcellulose (Na salt form, 0.31-0.35 DS carboxymethyl), prepared from cotton linters, was converted to the free acid (CMC-H) by adding 100 grams of CMC-Na to 2000 grams of 10% sulfuric acid. After about 10 minutes the slurry was filtered free of excess liquids and washed with demineralized water. The water-wet CMC-H was then solvent-exchanged first with acetic acid and then with butyric acid to yield a butyric acid-wet CMC-H. Three batches total of butyric acid wet CMC-H were prepared.

Then 153 grams of the butyric acid-wet CMC-H (about 40% solids) was placed in each of 3-1 liter reaction kettles and cooled to about 15° C., and a 15° C. solution of 20 grams of acetic anhydride, 205 grams of butyric anhydride, and 2.99 grams of sulfuric acid was added to each and these mixtures held at 25° C. for 1 hour. The temperature of these mixtures was then raised to 60° C. and held for 2.5 hours. Then a 60° C. solution of 76 grams of water and 76 grams of acetic acid was added to each reaction and the reaction temperature was maintained at 60° C. and held at this temperature for 4.5 hours. Then a solution of 7.2 grams of magnesium acetate tetrahydrate in 20 grams of water and 320 grams of acetic acid was added to each reaction. These mixtures were combined, cooled to 50° C., and filtered. The product was precipitated by pouring the solution into about 20 times its volume of water. The resulting solid was filtered and washed free of organic acids with water and dried at 60° C. The resulting white solid had the following composition: $DS_{BU}$=2.06 (calculated value based on 42.01 wt % butyryl); $DS_{AC}$=0.42 (calculated value based on 6.24 wt % acetyl); $DS_{Pr}$=0.02 (calculated value based on 0.29 wt % propionyl), DS carboxymethyl=0.29 (calculated value based on an acid number of 43.49); $M_n$=4,400; $M_w$=11,000; Polydispersity=2.52; IV (PM95)=0.11 dL/g; and an acid number of 43.49 mg KOH/gram of sample.

Example 4

An HS-CMCAB-64 is prepared along the lines of Examples 1-3 to produce a sample with the following composition: $DS_{BU}$=2.04 (calculated value based on 41.78 wt % butyryl); $DS_{AC}$=0.59 (calculated value based on 7.24 wt % acetyl); $DS_{Pr}$=0.03 (calculated value based on 0.45 wt % propionyl), DS carboxymethyl=0.29 (calculated value based on an acid number of about 45); $M_n$=1074; $M_w$=3174; Polydispersity=2.96; IV (PM95)=0.103 dL/g; and an acid number of about 45 mg KOH/gram of sample.

Examples 5-8

The HS-CMCAB samples made according to Examples 2-4, as set forth in Table 2, and commercial CMCAB samples (CMCAB-641-0.5 and CMCAB-641-0.2, available from Eastman Chemical Company, Kingsport, Tenn.), are dissolved in a variety of solvents and solvent blends (see Table 3) at 10% by weight at approximately 22° C. (72° F.) (room temperature). The samples are checked visually for solubility and rated as soluble-clear (9), soluble-slight haze (7), gels (5), partially soluble (3), and insoluble (1).

TABLE 2

Properties of HS-CMCAB's

| | Sample # | | |
|---|---|---|---|
| Ester Type | Example 2 HS-CMCAB | Example 3 HS-CMCAB | Example 4 HS-CMCAB |
| % Acetyl (GC) | 5.34 | 6.24 | 7.24 |
| % Butyryl (GC) | 42.89 | 42.01 | 41.78 |
| % Propionyl (GC) | 0.30 | 0.29 | 0.45 |
| % Hydroxyl (titration) | 2.12* | 2.19* | 0.27 |
| DS Acetyl | 0.46* | 0.42* | 0.59* |
| DS Butyryl | 2.22* | 2.06* | 2.04* |
| DS CM | 0.31* | 0.26* | 0.29* |
| IV (PM 95) | 0.11 | 0.11 | 0.103 |
| $M_n$ | 4600 | 4400 | 1074 |
| $M_w$ | 13100 | 11000 | 3174 |
| $M_w/M_n$ | 2.85 | 2.5 | 2.96 |

*Calculated as described in Examples 1 and 2.

TABLE 3

Solubility of HS-CMCAB's Compared to Commercial CMCAB's

| Solubility and Compatibility of New Cellulose Esters at 10 wt % solutions 1 = insoluble, 3 = partially soluble, 5 = gels, 7 = soluble hazy, 9 = soluble | Example 5 | Example 6 | Comparative Example 7 | Comparative Example 8 |
|---|---|---|---|---|
| Esters---- Solvent: | HS-CMCAB Sample of Example 2, Table 2 | HS-CMCAB Sample of Example 3, Table 2 | CMCAB-641-0.5 | CMCAB-641-0.2 |
| Blends: | | | | |
| Toluene/Ethyl Acetate 70/30 | 9 | 9 | 5 | 5 |
| Toluene/95% Tecsol C 80/20 | 9 | 9 | 9 | 9 |
| Tecsol C(95)/Ethyl Acetate 70/30 | 9 | 9 | 9 | 9 |
| Isopropyl Alcohol/Water 90/10 | 9 | 9 | 9 | 9 |
| MEK/MPK/MAK/EEP/n-Butyl Acetate 20/20/10/15/35 | 9 | 9 | 9 | 9 |
| EB/MPK/IPA/H$_2$O 37.5/25/25/12.5 | 9 | 9 | 9 | 9 |

TABLE 3-continued

Solubility of HS-CMCAB's Compared to Commercial CMCAB's

Solubility and Compatibility of New Cellulose Esters at 10 wt % solutions

| 1 = insoluble, 3 = partially soluble, 5 = gels, 7 = soluble hazy, 9 = soluble | Example 5 | Example 6 | Comparative Example 7 | Comparative Example 8 |
|---|---|---|---|---|
| Ketones: | | | | |
| Acetone | 9 | 9 | 9 | 9 |
| MEK | 9 | 9 | 9 | 9 |
| MPK | 9 | 9 | 9 | 3 |
| MAK | 9 | 9 | 5 | 3 |
| Eastman C-11 ketone | 9 | 9 | 3 | 3 |
| DIBK | 9 | 9 | 1 | 1 |
| Esters: | | | | |
| Ethyl Acetate | 9 | 9 | 5 | 5 |
| n-Butyl Propionate | 9 | 9 | 5 | 5 |
| PM Acetate | 9 | 9 | 9 | 9 |
| EB Acetate | 9 | 9 | 7 | 5 |
| n-Butyl Acetate | 9 | 9 | 5 | 3 |
| t-Butyl Acetate (ester solvent) | 9 | 9 | 3 | 3 |
| n-Propyl Propionate | 9 | 9 | 5 | 3 |
| Glycol ethers: | | | | |
| PM | 9 | 9 | 9 | 9 |
| DM | 9 | 9 | 9 | 9 |
| PB | 5 | 7 | 9 | 9 |
| DE | 9 | 9 | 9 | 9 |
| PP | 9 | 9 | 5 | 3 |
| EP | 9 | 9 | 9 | 9 |
| EB | 9 | 9 | 9 | 9 |
| Alcohols: | | | | |
| Diacetone alcohol | 9 | 9 | 9 | 9 |
| Methanol | 9 | 9 | 9 | 9 |
| Tecsol C (95) | 9 | 9 | 9 | 9 |
| Isopropyl alcohol | 7 | 7 | 3 | 3 |
| Other | | | | |
| EEP | 9 | 9 | 7 | 5 |
| Exxate 600 | 9 | 9 | 3 | 3 |
| NMP | 9 | 9 | 9 | 9 |
| VM & P Naptha | 1 | 3 | 3 | 3 |
| Toluene | 3 | 3 | 3 | 3 |
| Xylene | 3 | 3 | 3 | 3 |
| Dimethylaminoethanol | NA | NA | NA | NA |
| Methylene chloride | NA | NA | NA | NA |
| Pyridine | NA | NA | NA | NA |

As used herein, MEK=methyl ethyl ketone, MPK=methyl propyl ketone, MAK=methyl amyl ketone, PM acetate=propylene glycol methyl acetate, EB acetate=ethylene glycol butyl acetate, PM=propylene glycol monomethyl ether, DM=diethylene glycol methyl ether, PB=propylene glycol monobutyl ether, DE=diethylene glycol ethyl ether, PP=propylene glycol monopropyl ether, Eastman EP Solvent=ethylene glycol monopropyl ether, Eastman EB Solvent=ethylene glycol monobutyl ether, 95% Tecsol C=ethanol with methanol, MIBK and ethyl acetate as denaturants with 5% water, NMP=n-methyl pyrrolidone, Eastman EEP Solvent=ethyl 3-ethoxypropionate, IPA=isopropyl alcohol.

Examples 9-10 and Comparative Examples 11-12

Compatibility of HS-CMCAB's with Coatings Resins and Comparison with Commercial CMCAB-641-0.5 and CMCAB-641-0.2

Solutions are prepared using ratios of cellulosic to modifying resin of ¼, 1/1, and 4/1 at 10% solids in a mixture of n-butyl acetate/MEK/MPK/EEP/MAK (35/20/20/15/10). Films are cast on glass at 10 mil thickness. The films are allowed to air dry for 24 hours. The resulting films are evaluated visually under good room lights (Tables 4 and 5) for film clarity according to the following chart: 0=clear no haze; 1=very slight haze, only in bright light; 3=slight haze in room; 5=translucent; 7=translucent and incompatible domains; 9=hazy and incompatible; 10=opaque. The data show the improved compatibility of HS-CMCAB's versus conventional CMCAB's.

TABLE 4

Compatibility Studies

| Cellulose Ester:Resin Sample: | TYPE RESIN | Example 9 HS-CMCAB | Example 10 HS-CMCAB | Example 11 CMCAB-641-0.5 | Example 12 CMCAB-641-0.2 |
|---|---|---|---|---|---|
| R&H Acryloid AT954 1:4 | THERMOSET ACRYLIC | 0 | 0 | 1 | 0 |
| 1:1 | | 0 | 0 | 1 | 1 |
| 4:1 | | 0 | 0 | 1 | 1 |
| R&H Acryloid B-44 1:4 | ACRYLIC LACQUER | 0 | 0 | 1 | 1 |
| 1:1 | | 0 | 0 | 1 | 0 |
| 4:1 | | 0 | 0 | 7 | 7 |
| R&H Paraloid A-21 1:4 | ACRYLIC LACQUER | 0 | 0 | 7 | 7 |
| 1:1 | | 0 | 0 | 1 | 1 |
| 4:1 | | 0 | 0 | 1 | 1 |
| Cytec CYMEL 303 1:4 | HEXAMETHOXYMETHYL MELAMINE | 0 | 0 | 1 | 1 |
| 1:1 | | 0 | 0 | 1 | 0 |
| 4:1 | | 0 | 0 | 0 | 0 |
| ELVACITE 2008 1:4 | DUPONT ACRYLIC LACQUER | 0 | 0 | 1 | 0 |
| 1:1 | Methyl methacrylate (lo MW) | 0 | 0 | 1 | 1 |
| 4:1 | | 0 | 0 | 1 | 1 |
| Polymac HS220-2010 1:4 | Polyester | 0 | 0 | 1 | 0 |
| 1:1 | | 0 | 0 | 0 | 0 |
| 4:1 | | 0 | 0 | 0 | 0 |
| BEETLE 65 1:4 | Cytec Urea Formadehyde | 0 | 0 | 9 | 9 |
| 1:1 | | 0 | 0 | 9 | 7 |
| 4:1 | | 7 | 7 | 7 | 7 |
| UCAR VYHD 1:4 | VINYL CHLORIDE/VINYL ACETATE | 9 | 9 | 9 | 9 |
| 1:1 | | 9 | 9 | 9 | 9 |
| 4:1 | | 7 | 7 | 9 | 9 |
| CK-2103 1:4 | UC PHENOLIC | 0 | 0 | 0 | 0 |
| 1:1 | | 0 | 0 | 0 | 0 |
| 4:1 | | 0 | 0 | 0 | 0 |
| R&H Paraloid WR97 1:4 | RH WATER REDUCIBLE TS ACRYLIC | 0 | 0 | 0 | 0 |
| 1:1 | | 0 | 0 | 7 | 9 |
| 4:1 | | 0 | 0 | 7 | 9 |

TABLE 5

Compatibility Studies

| Cellulose Ester:Resin Sample: | TYPE RESIN | Example 9 HS-CMCAB | Example 10 HS-CMCAB | Example 11 CMCAB-641-0.5 | Example 12 CMCAB-641-0.2 |
|---|---|---|---|---|---|
| Neat esters 1:0 | Cellulosic resins without resins | 0 | 0 | 1 | 1 |
| R&H Acryloid AU608X | R&H Acrylic | 0 | 0 | 0 | 0 |
| 1:4 | | | | | |
| 1:1 | | 0 | 0 | 0 | 0 |
| 4:1 | | 0 | 0 | 0 | 0 |
| EPON 1001F 1:4 | DUPONT EPOXY | 5 | 5 | 5 | 5 |
| 1:1 | | 1 | 1 | 1 | 1 |
| 4:1 | | 5 | 5 | 7 | 7 |
| VERSAMID 750 1:4 | POLYAMIDE | 9 | 9 | 9 | 9 |
| 1:1 | | 9 | 9 | 9 | 9 |
| 4:1 | | 9 | 9 | 9 | 9 |
| Duramac 207-2706 1:4 | EASTMAN short oil, TOFA, 23% n-butac, corrosion resistant | 0 | 0 | 0 | 0 |
| 1:1 | | 0 | 0 | 0 | 0 |
| 4:1 | | 0 | 0 | 0 | 0 |
| Duramac 5205 1:4 | Med. Coconut oil alkyd, 40% xylene. Plasticizer for NC | 0 | 0 | 1 | 1 |
| 1:1 | | 0 | 0 | 1 | 1 |
| 4:1 | | 0 | 0 | 9 | 9 |
| Duramac 51-5135 1:4 | EASTMAN Med oil SOYA alkyd gasoline resistant, 40% VMP | 5 | 5 | 7 | 7 |
| 1:1 | | 5 | 5 | 7 | 7 |
| 4:1 | | 0 | 0 | 7 | 7 |
| Duramac 207-1405 1:4 | EASTMAN SOYA chain stopped alkyd, 50% NV | 5 | 5 | 7 | 7 |
| 1:1 | | 5 | 5 | 7 | 7 |
| 4:1 | | 3 | 3 | 7 | 7 |
| ELVACITE 2044 1:4 | DuPont ethyl methacrylate | 0 | 0 | 1 | 1 |
| 1:1 | | 0 | 0 | 7 | 7 |
| 4:1 | | 0 | 0 | 7 | 7 |
| Des N 3300 1:4 | Bayer Polymeric isocyanate | 0 | 0 | 0 | 0 |
| 1:1 | | 0 | 0 | 3 | 3 |
| 4:1 | | 0 | 0 | 1 | 3 |

Example 13

The viscosity profile of an HS-CMCAB is determined by dissolving an HS-CMCAB (Example 4) in the following solvent blend (Eastman EB solvent/Methylpropyl ketone/Isopropyl alcohol/Water 37.5125125/12.5 by weight) at 50% solids and 66% solids. The viscosity is measured using a Brookfield viscometer at room temperature and exhibits an exponential increase with increased solids content that is typical of conventional cellulose esters, but unexpected for carboxyalkylcellulose esters with such a low molecular weight.

Example 14

Baking Clearcoat Formulation with HS-CMCAB

A baking clearcoat formulation containing HS-CMCAB is prepared as described in Table 6. The film dries clear at 5 mil film thickness and shows no visible surface defects.

TABLE 6

| | % NV | Grams | G solids |
|---|---|---|---|
| HS CMCAB solution in EB/MPK/IPA/H2O* | 66.67 | 20 | 13.334 |
| Water | | 15 | 0 |
| Dimethylaminoethanol | | 1.4 | 0 |
| Subtotal | | | |
| Added to | | | |

TABLE 6-continued

| | % NV | Grams | G solids |
|---|---|---|---|
| Cytec Cymel 327 | 90 | 36.4 | 32.76 |
| Rohm and Haas WR97 | 70 | 136.24 | 95.368 |
| Dimethylaminoethanol | | 4.15 | |
| Total | | 213.19 | 141.462 |

*HS-CMCAB solvent system was Eastman EB/Methyl Propyl ketone/isopropyl alcohol/water (EB/MPK/IPA/H2O) at a weight ratio of 45/30/30/15

Example 15

Baking Clearcoat

A baking clearcoat formulation containing HS-CMCAB is prepared according to Table 7. The film dries clear at 5 mil film thickness and shows no visible surface defects.

TABLE 7

| | % NV | Grams | G solids |
|---|---|---|---|
| HS CMCAB in EB/MPK/IPA/H2O | 50 | 35 | 17.5 |
| Cytec Cymel 325 | 80 | 7.5 | 6 |
| Dimethylaminoethanol | | 1.92 | 0 |
| Total | | 44.42 | 23.5 |

Example 16

Baking Clearcoat

A baking clearcoat formulation containing HS-CMCAB is prepared according to Table 8. The film dries clear at 5 mil film thickness and shows no visible surface defects.

TABLE 8

|  | % NV | Grams | G solids |
|---|---|---|---|
| HS-CMCAB in EB/MPK/IPA/H2O | 50 | 10.59 | 5.295 |
| Eastman Reactol 175 (solvent based acrylic) | 80 | 50 | 40 |
| Cytec Cymel 327 | 80 | 21.19 | 16.952 |
| Dimethylaminoethanol |  | 0.4 | 0 |
| Water |  | 40 | 0 |
| Total |  | 122.18 | 62.247 |

Example 17

Pigmented Coating Formulation

A pigmented coating formulation containing HS-CMCAB is prepared according to Table 9. The film dries opaque and shows no visible surface defects.

TABLE 9

|  | % NV | Grams | G solids |
|---|---|---|---|
| HS-CMCAB in EB/MPK/IPA/H2O | 50 | 21.86 | 10.93 |
| TiO2 Pigment powder | 100 | 10 | 10 |
| Cymel 325 | 80 | 7.5 | 6 |
| Dimethylaminoethanol |  | 1.2 | 0 |
| Water |  | 25.6 | 0 |
|  |  | 66.16 | 26.93 |

Example 18

Aluminum Flake Dispersion Containing HS-CMCAB for Metallic Flake Paints

An aluminum flake dispersion containing HS-CMCAB is prepared according to Table 10 by mixing the materials and stirring. A smooth aluminum flake dispersion without clumps is obtained.

TABLE 10

|  | % NV | Grams | G solids |
|---|---|---|---|
| Silberline Aquapaste 2700-A2B | 60 | 15 | 9 |
| HS-CMCAB in EB/MPK.IPA/H2O | 60 | 15 | 9 |

Example 19

Aluminum Flake Solventborne Basecoat

An aluminum flake solventborne basecoat containing HS-CMCAB is prepared according to Table 11. A level of 48.65% non-volatiles is obtained.

TABLE 11

|  | % NV | Grams | G solids |
|---|---|---|---|
| Silberline Aquapaste 2700-A2B | 60 | 15 | 9 |
| HS-CMCAB in EB/MPK/IPA/H2O | 60 | 15 | 9 |
| Dimethylaminoethanol |  | 0.99 |  |
| Rohm and Haas WR97 | 70 | 52.8 | 36.96 |
| Dimethylaminoethanol |  | 1.58 |  |
| MEK/PM Acetate/EEP (5/4/2) |  | 30.17 | 0 |
| Total |  | 112.97 | 54.96 |
| % NV = 48.22 |  |  |  |

Example 20

Aluminum Flake Waterborne Basecoat

An aluminum flake waterborne basecoat containing HS-CMCAB is prepared according to Table 12. A level of 36.9% non-volatiles is obtained and a Flop Index of 15.27 is obtained.

TABLE 12

|  | % NV | Grams | G solids |
|---|---|---|---|
| Silberline Aquapaste 2700-A2B | 60 | 15 | 9 |
| HS-CMCAB in EB/MPK/IPA/H2O* | 60 | 15 | 9 |
| Rohm and Haas WR97 | 70 | 52.8 | 36.96 |
| DMEA |  | 2.57 | 0 |
| Cymel 325 | 80 | 20.04 | 16.03 |
| Water |  | 155.68 |  |
| % NV = 27.19 |  | 261.09 | 70.99 |
| Flop Index = 15.27 |  |  |  |

*HS-CMCAB solvent system was Eastman EB/Methyl Propyl ketone/isopropyl alcohol/water (EB/MPK/IPA/H2O) at a weight ratio of 45/30/30/15

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A carboxy($C_1$-$C_3$)alkylcellulose ester having the following properties:
   a maximum degree of substitution per anhydroglucose unit of from 3.08 to 3.50, comprised of the following substitutions:
     a degree of substitution per anhydroglucose unit of carboxy($C_1$-$C_3$)alkyl of from 0.20 to 1.2,
     a degree of substitution per anhydroglucose unit of hydroxyl of from 0.10 to 0.90,
     a degree of substitution per anhydroglucose unit of butyryl of from 1.10 to 2.55, and
     a degree of substitution per anhydroglucose unit of acetyl of from 0.10 to 0.90;
   an inherent viscosity of 0.05 to 0.13 dL/g, as measured in a 60/40 (wt./wt.) solution of phenol/tetrachloroethane at 25° C.;
   a number average molecular weight ($M_n$) of from about 1,000 to about 7,000;
   a weight average molecular weight of from about 1,500 to about 23,000; and
   a polydispersity of from about 1.20 to about 7.0.

2. The carboxy($C_1$-$C_3$)alkylcellulose ester of claim 1, wherein the carboxy($C_1$-$C_3$)alkylcellulose ester is a carboxymethylcellulose ester, and wherein the degree of substitution of butyryl is from about 1.45 to about 2.27.

3. The carboxy($C_1$-$C_3$)alkylcellulose ester of claim 1, wherein the carboxy($C_1$-$C_3$)alkylcellulose ester is a carboxymethylcellulose ester having an acid number of from about 40 to about 200 mg KOH/g sample.

4. The carboxy($C_1$-$C_3$)alkylcellulose ester of claim 1, wherein the carboxy($C_1$-$C_3$)alkylcellulose ester is a carboxymethylcellulose ester having an acid number of from about 40 to about 75 mg KOH/g sample.

5. The carboxy($C_1$-$C_3$)alkylcellulose ester of claim 1, wherein the carboxy($C_1$-$C_3$)alkylcellulose ester is a carboxymethylcellulose ester having an acid number of from about 75 to about 105 mg KOH/g sample.

6. The carboxy($C_1$-$C_3$)alkylcellulose ester of claim 1, wherein the carboxy($C_1$-$C_3$)alkylcellulose ester is a carboxymethylcellulose ester having an acid number of from about 105 to about 200 mg KOH/g sample.

7. The carboxy($C_1$-$C_3$)alkylcellulose ester according to claim 2, wherein the ester forms a clear solution as a 10 weight percent mixture in diisobutyl ketone.

8. The carboxy($C_1$-$C_3$)alkylcellulose ester according to claim 4, wherein the ester forms a clear solution as a 10 weight percent mixture in diisobutyl ketone.

9. The carboxy($C_1$-$C_3$)alkylcellulose ester according to claim 2, wherein the ester forms a clear solution as a 10 weight percent mixture in a 70/30 mixture of toluene/ethyl acetate.

10. The carboxy($C_1$-$C_3$)alkylcellulose ester according to claim 4, wherein the ester forms a clear solution as a 10 weight percent mixture in a 70/30 mixture of toluene/ethyl acetate.

11. The carboxy($C_1$-$C_3$)alkylcellulose ester according to claim 2, wherein the ester forms a clear solution as a 10 weight percent mixture in methyl amyl ketone.

12. The carboxy($C_1$-$C_3$)alkylcellulose ester according to claim 4, wherein the ester forms a clear solution as a 10 weight percent mixture in methyl amyl ketone.

13. The carboxy($C_1$-$C_3$)alkylcellulose ester according to claim 2, wherein the ester forms a clear solution as a 10 weight percent mixture in ethyl acetate.

14. The carboxy($C_1$-$C_3$)alkylcellulose ester according to claim 4, wherein the ester forms a clear solution as a 10 weight percent mixture in ethyl acetate.

15. The carboxy($C_1$-$C_3$)alkylcellulose ester according to claim 2, wherein the ester forms a clear solution as a 10 weight percent mixture in n-butyl propionate.

16. The carboxy($C_1$-$C_3$)alkylcellulose ester according to claim 4, wherein the ester forms a clear solution as a 10 weight percent mixture in n-butyl propionate.

17. The carboxy($C_1$-$C_3$)alkylcellulose ester according to claim 2, wherein the ester forms a clear solution as a 10 weight percent mixture in n-butyl acetate.

18. The carboxy($C_1$-$C_3$)alkylcellulose ester according to claim 4, wherein the ester forms a clear solution as a 10 weight percent mixture in n-butyl acetate.

19. The carboxy($C_1$-$C_3$)alkylcellulose ester according to claim 2, wherein the ester forms a clear solution as a 10 weight percent mixture in n-propyl propionate.

20. The carboxy($C_1$-$C_3$)alkylcellulose ester according to claim 4, wherein the ester forms a clear solution as a 10 weight percent mixture in n-propyl propionate.

21. The carboxy($C_1$-$C_3$)alkylcellulose ester according to claim 2, wherein the ester forms a clear solution as a 10 weight percent mixture in propylene glycol monopropyl ether.

22. The carboxy($C_1$-$C_3$)alkylcellulose ester according to claim 4, wherein the ester forms a clear solution as a 10 weight percent mixture in propylene glycol monopropyl ether.

23. The carboxy($C_1$-$C_3$)alkylcellulose ester of claim 1, wherein the carboxy($C_1$-$C_3$)alkylcellulose ester is a carboxymethylcellulose ester.

24. The carboxymethylcellulose ester of claim 23, wherein the degree of substitution per anhydroglucose unit of hydroxyl is from 0.10 to 0.90, the degree of substitution of butyryl is from about 2.04 to about 2.22, and the degree of substitution of acetyl is from about 0.42 to about 0.59.

25. The carboxy($C_1$-$C_3$)alkylcellulose ester of claim 1, wherein the inherent viscosity is from 0.07 to 0.13 dL/g.

26. The carboxy(C1-C3)alkylcellulose ester of claim 1, wherein the number average molecular weight ($M_n$) is from 1,500 to 5,000.

27. The carboxy($C_1$-$C_3$)alkylcellulose ester according to claim 25, wherein the degree of substitution per anhydroglucose unit of hydroxyl is from 0.10 to 0.90, the degree of substitution of butyryl is from 1.10 to 2.55, and the degree of substitution of acetyl is from 0.10 to about 0.90.

28. A coating composition, comprising:
   a) from about 0.1 to about 50 weight percent, based on the total weight of (a) and (b) in the coating composition, of the carboxy($C_1$-$C_3$)alkylcellulose ester according to claim 1;
   b) from about 50 to about 99.9 weight percent, based on the total weight of (a) and (b) in the composition, of at least one resin selected from the group consisting of a polyester, a polyester-amide, a cellulose ester, an alkyd, a polyurethane, an epoxy resin, a polyamide, an acrylic, a vinyl polymer, a polyisocyanate, and a melamine; and
   c) at least one solvent;
wherein the total weight of (a) and (b) is from about 5 to about 85 weight percent of the total weight of (a), (b), and (c).

29. The coating composition according to claim 28, further comprising about 0.1 to about 15 weight percent, based on the total weight of the composition, of one or more coatings additives selected from the group consisting of leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

30. The coating composition according to claim 28, wherein the inherent viscosity of the carboxyalkylcellulose ester is from 0.07 to 0.11 dL/g.

31. A pigment dispersion, comprising:
   the carboxy($C_1$-$C_3$)alkylcellulose ester according to claim 1; and
   about 20 to 50 weight percent by weight of a pigment.

32. The pigment dispersion of claim 31, wherein the pigment is comprised of alumina or mica.

33. A radiation curable coating containing the carboxy($C_1$-$C_3$)alkylcellulose ester according to claim 1.

34. A powder coating containing the carboxy($C_1$-$C_3$)alkylcellulose ester according to claim 1.

35. An ink composition containing the carboxy($C_1$-$C_3$)alkylcellulose ester according to claim 1.

36. A waterborne coating composition comprising:
(a) from about 0.1 to about 50 weight percent, based on the total weight of (a) and (b), of the carboxy($C_1$-$C_3$)alkyl-cellulose ester according to claim 1, wherein at least about 25 percent of the carboxyl groups have been neutralized with ammonia or an amine;
(b) at least 50 weight percent, based on the total weight of (a) and (b), of a compatible water soluble or water dispersible resin selected from the group consisting of polyesters, polyester-amides, cellulose esters, alkyds, polyurethanes, epoxy resins, polyamides, acrylics, vinyl polymers, polyurethanes, and melamines;
(c) water; and
(d) an organic solvent;
wherein the total weight of (a) and (b) is between 5 and 50 weight percent of the total composition and the organic solvent comprises less than 20 weight percent of the total weight of the composition.

* * * * *